United States Patent
Kim

(10) Patent No.: US 11,737,073 B2
(45) Date of Patent: Aug. 22, 2023

(54) METHOD OF TRANSMITTING AND RECEIVING DATA IN WIRELESS COMMUNICATION SYSTEM SUPPORTING FULL-DUPLEX RADIO AND APPARATUS THEREFOR

(71) Applicant: LG ELECTRONICS INC., Seoul (KR)

(72) Inventor: Insu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 17/111,236

(22) Filed: Dec. 3, 2020

(65) Prior Publication Data

US 2022/0182992 A1    Jun. 9, 2022

(51) Int. Cl.
*H04W 72/044* (2023.01)
*H04L 5/00* (2006.01)
*H04W 72/541* (2023.01)

(52) U.S. Cl.
CPC ......... *H04W 72/046* (2013.01); *H04L 5/0048* (2013.01); *H04W 72/541* (2023.01)

(58) Field of Classification Search
CPC ............. H04W 72/046; H04W 72/082; H04W 72/541; H04L 5/0048
See application file for complete search history.

(56) References Cited

U.S. PATENT DOCUMENTS

| | | | |
|---|---|---|---|
| 9,379,806 B1* | 6/2016 | Mandell | H01Q 3/40 |
| 2005/0206564 A1* | 9/2005 | Mao | H01Q 3/2682 |
| | | | 342/377 |
| 2013/0136110 A1* | 5/2013 | Yamamoto | H04L 1/20 |
| | | | 370/336 |
| 2020/0153498 A1* | 5/2020 | Kotecha | H04B 7/0695 |
| 2020/0296576 A1* | 9/2020 | Ouchi | H04L 5/001 |
| 2020/0396621 A1* | 12/2020 | Park | H04B 7/024 |
| 2021/0376904 A1* | 12/2021 | Zhou | H04B 7/088 |
| 2022/0022206 A1* | 1/2022 | Ibrahim | H04B 17/345 |
| 2022/0053353 A1* | 2/2022 | Lee | H04W 24/10 |
| 2022/0174522 A1* | 6/2022 | Santhanam | H04W 36/08 |

* cited by examiner

*Primary Examiner* — Jasper Kwoh
(74) *Attorney, Agent, or Firm* — Lee Hong Degerman Kang Waimey

(57) ABSTRACT

A method of transmitting and receiving signals by a transmission device in a wireless communication system is disclosed. The method includes receiving a reference signal (RS) using a received beam in a first array, measuring a maximum value of an interference signal based on the RS, and determining a beam direction and a weight of the received beam based on the maximum value of the interference signal. The interference signal is measured within a predetermined weight range.

10 Claims, 44 Drawing Sheets

| | Beam Tracking 1-Periodicity (Array0: Rx / Array1: Tx) | |
|---|---|---|
| | Rx Beam Sweeping | Tx Beam Sweeping |
| Symbol | | |
| BS Array0 | UL Rx Beam Angle: {A0-2, A0-1, A0, A0+1, A0+2}<br>UL Rx Beam Weight: {W0-1, W0, W0+1} | UL Rx Beam Angle: {A0}<br>UL Rx Beam Weight: {W0} |
| UE1 | UL Tx Beam Angle: {A0}<br>UL Tx Beam Weight: {W0} | UL Tx Beam Angle: {A0-2, A0-1, A0, A0+1, A0+2}<br>UL Tx Beam Weight: {W0-1, W0, W0+1} |
| BS Array1 | DL Tx Beam Angle: {A0}<br>DL Tx Beam Weight: {W0} | DL Tx Beam Angle: {A0-2, A0-1, A0, A0+1, A0+2}<br>DL Tx Beam Weight: {W0-1, W0, W0+1} |
| UE0 | DL Rx Beam Angle: {A0-2, A0-1, A0, A0+1, A0+2}<br>DL Rx Beam Weight: {W0-1, W0, W0+1} | DL Rx Beam Angle: {A0}<br>DL Rx Beam Weight: {W0} |

METHOD OF TRANSMITTING AND RECEIVING DATA IN WIRELESS COMMUNICATION SYSTEM SUPPORTING FULL-DUPLEX RADIO AND APPARATUS THEREFOR

BACKGROUND OF THE DISCLOSURE

Field of the Disclosure

The present disclosure relates to a method of transmitting and receiving data related to full-duplex radio (FDR) in a wireless communication system supporting FDR and an apparatus therefor.

Discussion of the Related Art

A wireless communication system is a multiple access system that supports communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Sidelink (SL) refers to a communication scheme in which a direct link is established between user equipments (UEs) and the UEs directly exchange voice or data without intervention of a base station (BS). SL is considered as one method of relieving a burden on the BS due to rapidly growing data traffic.

A UE or a vehicle may receive resources allocated for an uplink signal and resources allocated for a downlink signal from the BS. The UE or the vehicle may receive the resources allocated for the uplink signal through uplink control information (UCI) from the BS or receive the resources allocated for the downlink signal through downlink control information (DCI) from the BS.

As more and more communication devices demand larger communication capacity, there is a need for enhanced mobile broadband (eMBB) communication relative to legacy radio access technology (RAT). Accordingly, a communication system is under discussion, for which services or UEs sensitive to reliability and latency are considered. Next-generation RAT in which eMBB communication, machine type communication (MTC), and ultra-reliable and low-latency communication (URLLC) are considered may be referred to as new RAT or NR. In NR, vehicle-to-everything (V2X) communication may also be supported.

SUMMARY OF THE DISCLOSURE

Accordingly, the present disclosure is directed to a method of transmitting and receiving data in a wireless communication system supporting full-duplex communication and an apparatus therefor that substantially obviate one or more problems due to limitations and disadvantages of the related art.

In a situation in which interference significantly influences the performance of a receiver, if an existing beamforming scheme in a half-duplex mode, for maximizing beam gain for a desired signal, is used without change, since a beam considering the effect of an interference signal may not be formed, thereby degrading the quality of reception performance. Therefore, an object is to provide a beam management/tracking procedure that applies beamforming technology in a full-duplex communication environment and considers the effect of interference in order to reduce interference without an additional circuit.

The objects to be achieved are not limited to what has been particularly described hereinabove and other objects not described herein will be more clearly understood by persons skilled in the art from the following detailed description.

According to an aspect, a method of transmitting and receiving signals by a transmission device in a wireless communication system includes receiving a reference signal (RS) using a received beam in a first array, measuring a maximum value of an interference signal based on the RS, and determining a beam direction and a weight of the received beam based on the maximum value of the interference signal. The interference signal is measured within a predetermined weight range.

Additionally or alternatively, the predetermined weight range may be generated in a form of table information, the table information may include at least one of a weight index, a difference value between a main lobe peak level and a sidelobe peak level, a half-power beam width (HPBW), or a weight coefficient to be applied to each antenna element, and the difference value between the main lobe peak level and the sidelobe peak level may be mapped to the weight index in one-to-one correspondence.

Additionally or alternatively, the interference signal may include a self-interference (SI) signal and a cross-link interference (CLI) signal.

Additionally or alternatively, the method may further include setting an initial beam weight and an initial beam direction, and the maximum value of the interference signal may be measured based on the initial beam weight and the initial beam direction.

Additionally or alternatively, the method may further include transmitting a signal using a transmitted beam in a second array, measuring a maximum value of a self-interference (SI) signal based on the transmitted signal, and determining a beam direction and a weight based on the maximum value of the SI signal.

Additionally or alternatively, the method may further include receiving a beam command message from a base station, and the beam command message may include resource allocation information about the transmitted beam and the received beam.

Additionally or alternatively, the method may further include receiving information about a first beam direction and a first weight corresponding to a maximum value of a ratio of strength of a downlink signal to strength of the SI signal from a base station and receiving information about a second beam direction and a second weight corresponding to a maximum value of a ratio of strength of an uplink signal to strength of the CLI signal. The beam direction and the weight of the transmitted beam may be determined based on the beam direction and the first weight, and the beam direction and the weight of the received beam may be determined based on the first beam direction, the first weight, the second beam direction, and the second weight.

According to another aspect, a transmission device of a wireless communication system includes a transmitter, a receiver, and a controller. The receiver is configured to receive a reference signal (RS) using a received beam in a first array, the controller is configured to measure a maximum value of an interference signal based on the RS and determine a beam direction and a weight of the received beam based on the maximum value of the interference signal, and the interference signal is measured within a predetermined weight range.

According to another aspect, an apparatus for a user equipment includes at least one processor, and at least one computer memory operably connected to the at least one processor and configured to store instructions for causing, when executed, the at least one processor to perform an operation. The operation includes: receiving a reference signal (RS) using a received beam in a first array, measuring a maximum value of an interference signal based on the RS, and determining a beam direction and a weight of the received beam based on the maximum value of the interference signal. The interference signal is measured within a predetermined weight range.

According to another aspect, a computer readable storage medium is configured to store at least one computer program including instructions for causing, when executed by at least one processor, the at least one processor to perform an operation for a user equipment. The operation includes receiving a reference signal (RS) using a received beam in a first array, measuring a maximum value of an interference signal based on the RS, and determining a beam direction and a weight of the received beam based on the maximum value of the interference signal. The interference signal is measured within a predetermined weight range.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the present disclosure, illustrate various implementation examples of the present disclosure and together with the description serve to explain the principle of the present disclosure. In the drawings:

FIGS. 31a and 31b are diagrams illustrating an example of time resource allocation of an RS for Tx and Rx beam information measurement according to the present disclosure;

DETAILED DESCRIPTION

Figure 1:
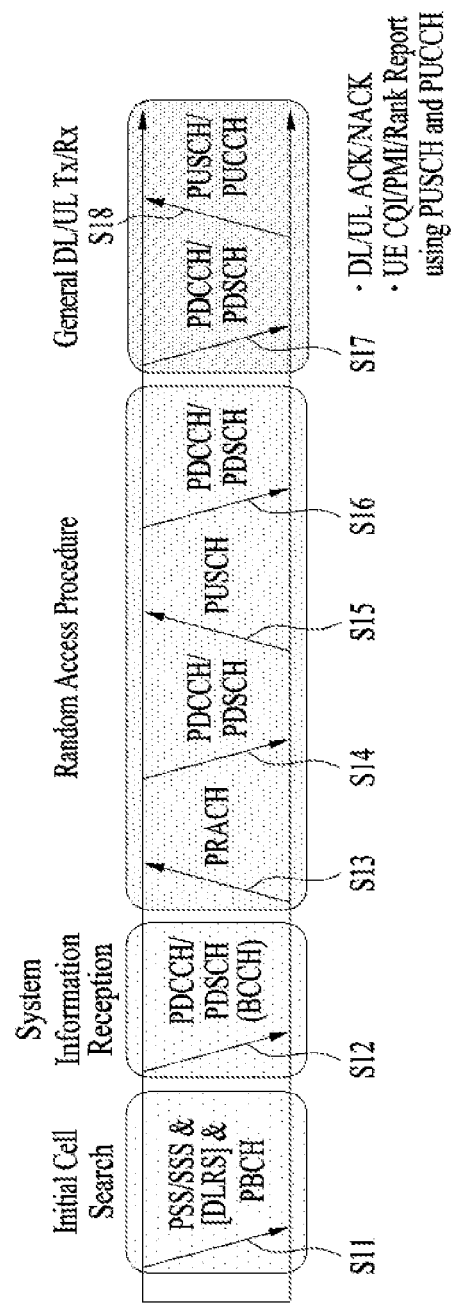
FIG. 1 is a diagram illustrating physical channels used in various embodiments of the present disclosure and a signal transmission method using the same.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details. For example, while the following detailed description is given under the assumption that a mobile communication system is a 3GPP LTE or LTE-A system, the mobile communication system is applicable to other arbitrary mobile communication systems except for matters that are specific to the 3GPP LTE or LTE-A system. In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

In the following description, downlink (DL) refers to communication from a base station (BS) to a user equipment (UE), and uplink (UL) refers to communication from the UE to the BS. On DL, a transmitter may be a part of the BS and a receiver may be a part of the UE. On UL, the transmitter may be a part of the UE and the receiver may be a part of the BS. In the present disclosure, the BS may be represented as a first communication device and the UE may be represented as a second communication device. The BS may be replaced with the term "fixed station", "Node B", "evolved-Node B (eNB)", "next generation Node B (gNB)", "base transceiver system (BTS)", "access point (AP)", "network or 5G network node", "AI system", "roadside unit (RSU)", or "robot". The UE may be replaced with the term "terminal", "mobile station (MS)", "user terminal (UT)", "mobile subscriber station (MSS), "subscriber station (SS)", "advanced mobile station (AMS)", "wireless terminal (WT)", "machine-type communication (MTC) device", "machine-to-machine (M2M) device", "device-to-device (D2D) device", "vehicle", "robot", or "AI module".

Technology described below may be used in various radio access systems such as a code division multiple access (CDMA) system, a frequency division multiple access (FDMA) system, a time division multiple access (TDMA) system, an orthogonal frequency division multiple access (OFDMA) system, and a single-carrier frequency division multiple access (SC-FDMA) system. CDMA may be implemented by radio technology such as universal terrestrial radio access (UTRA) or CDMA2000. TDMA may be implemented by radio technology such as global system for mobile communications (GSM), general packet radio service (GPRS), or enhanced data rates for GSM evolution (EDGE). OFDMA may be implemented by radio technology such as institute of electrical and electronics engineers (IEEE) 802.11 (Wi-Fi), IEEE 802.16 (WiMAX), IEEE 802.20, or evolved-UTRA (E-UTRA). UTRA is part of universal mobile telecommunications system (UMTS). 3rd generation partnership project (3GPP) long-term evolution (LTE) is part of evolved UMTS (E-UMTS) using E-UTRA and LTE-advanced (LTE-A)/LTE-A pro is an evolved version of 3GPP LTE. 3GPP new radio or new radio access technology (3GPP NR) is an evolved version of 3GPP LTE/LTE-A pro.

For clarity, a description is given based on a 3GPP communication system (e.g., LTE-A or NR) but the scope of the present disclosure is not limited thereto. LTE refers to technology beyond 3GPP TS 36.xxx Release 8. More specifically, LTE technology beyond 3GPP TS 36.xxx Release 10 is referred to as LTE-A, and LTE technology beyond 3GPP TS 36.xxx Release 13 is referred to as LTE-A pro. 3GPP NR refers to technology beyond TS 38.xxx Release 15. LTE/NR may be referred to as a 3GPP system. "xxx" represents a detailed number of a technical specification. LTE/NR may be collectively referred to as a 3GPP system.

In the present disclosure, a node refers to a fixed point capable of transmitting/receiving a radio signal to/from a UE by communication with the UE. Various types of BSs may be used as nodes regardless of the names thereof. For example, a BS, NB, eNB, Pico-cell eNB (PeNB), home eNB (HeNB), relay, or repeater may be the node. Furthermore, the node may not be the BS. For example, a radio remote head (RRH) or a radio remote unit (RRU) may be the node. Generally, the RRH or RRU has a power level lower than that of the BS. At least one antenna is installed per node. The antenna may refer to a physical antenna or refer to an antenna port, a virtual antenna, or an antenna group. The node may also be called a point.

In the present disclosure, a cell refers to a specific geographical area or a radio resource in or on which one or more nodes provide communication services. The "cell" of the geographic area may be understood as coverage within which a node may provide services using a carrier, and the "cell" of the radio resources is associated with bandwidth, which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of a radio resource used by the node. Accordingly, the term "cell" may be used to indicate service coverage by the node sometimes, the radio resource at other times, or a range within which a signal using the radio resource may reach with valid strength at other times.

In the present disclosure, communicating with a specific cell may mean communicating with a BS or a node that provides communication services to the specific cell. A DL/UL signal of the specific cell refers to a DL/UL signal from/to the BS or the node that provides communication services to the specific cell. A cell that provides UL/DL communication services to a UE is especially called a serving cell. Furthermore, channel status/quality of the specific cell refers to status/quality of a channel or a communication link formed between the BS or the node that provides communication services to the specific cell and the UE.

The "cell" associated with the radio resource may be defined by a combination of DL resources and UL resources, i.e., a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information transmitted through a corresponding cell. In this case, the carrier frequency may be equal to or different from a center frequency of each cell or CC. Hereinbelow, a cell operating on a primary frequency will be referred to as a primary cell (Pcell) or a primary CC (PCC), and a cell operating on a secondary frequency will be referred to as a secondary cell (Scell) or a secondary CC (SCC). The Scell may be configured after a UE and a BS perform a radio resource control (RRC) connection establishment procedure and thus RRC connection is established between the UE and the BS, i.e., after the UE is in an RRC-CONNECTED state. RRC connection may mean a path through which RRC of the UE may exchange messages with RRC of the BS. The Scell may be configured to provide additional radio resources to the UE. The S cell and the Pcell may form a set of serving cells for the UE according to capabilities of the UE. Only one serving cell configured with the Pcell exists for an RRC_CONNECTED UE which is not configured with carrier aggregation or does not support carrier aggregation.

A cell supports a unique RAT. For example, LTE RAT-based transmission/reception is performed in an LTE cell, and 5G RAT-based transmission/reception is performed in a 5G cell.

Carrier aggregation (CA) aggregates a plurality of carriers each having a narrower system bandwidth than a target bandwidth to support broadband. CA differs from OFDMA in that DL or UL communication is performed using a plurality of carrier frequencies each forming a system bandwidth (or channel bandwidth) in the former, and DL or UL communication is performed by carrying a basic frequency band divided into a plurality of orthogonal subcarriers in one carrier frequency in the latter. In OFDMA or orthogonal frequency division multiplexing (OFDM), for example, one frequency band having a certain system bandwidth is divided into a plurality of subcarriers with a predetermined subcarrier spacing, information/data is mapped to the plurality of subcarriers, and the frequency band in which the information/data has been mapped is transmitted in a carrier frequency of the frequency band through frequency upconversion. In wireless CA, frequency bands each having a system bandwidth and a carrier frequency may be used simultaneously used for communication, and each frequency band used in CA may be divided into a plurality of subcarriers with a predetermined subcarrier spacing.

The 3GPP-based communication standards define DL physical channels corresponding to resource elements (REs) carrying information originated from upper layers of a physical layer (e.g., a medium access control (MAC) layer, a radio link control (RLC) layer, a packet data convergence protocol (PDCP) layer, an RRC layer, a service data adaptation protocol (SDAP) layer, and a non-access stratum (NAS) layer), and DL physical signals corresponding to REs which are used in the physical layer but do not deliver information originated from the upper layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal (RS) and a synchronization signal are defined as the DL physical signals. The RS, also called a pilot, means a signal of a predefined special waveform known to both a BS and a UE. For example, a cell-specific RS (CRS), a UE-specific RS (UE-RS), a positioning RS (PRS), a channel state information RS (CSI-RS), and a demodulation RS (DMRS) are defined as DL RSs. The 3GPP-based communication standards also define UL physical channels corresponding to REs carrying information originating from upper layers, and UL physical signals corresponding to REs which are used in the physical layer but do not carry information originating from the upper layers. For example, a physical uplink shared channel (PUSCH), a physical uplink control channel (PUCCH), and a physical random access channel (PRACH) are defined as the UL physical channels, and a DMRS for a UL control/data signal and a sounding reference signal (SRS) used for UL channel measurement are defined for the UL physical signals.

In the present disclosure, the PDCCH and the PDSCH may refer to a set of time-frequency resources or REs that carry downlink control information (DCI) and DL data, respectively. The PUCCH, PUSCH, and PRACH refer to a set of time-frequency resources or REs that carry uplink control information (UCI), UL data, and random access signals, respectively. In the following description, "the UE transmits a UL physical channel (e.g., a PUCCH, PUSCH, or PRACH)" may mean that the UE transmits the UCI, UL data, or random access signals on or through the UL physical channel, and "the BS receives a UL physical channel" may mean that the BS receives the UCI, UL data, or random access signal on or through the UL physical channel. "The BS transmits a DL physical channel (e.g., a PDCCH or PDSCH)" may mean that the BS transmits the DCI or DL data on or through the DL physical channel, and "the UE receives a DL physical channel" may mean that the UE receives the DCI or DL data on or through the DL physical channel.

In the present disclosure, a transport block (TB) is payload for a physical layer. For example, data provided to the physical layer by an upper layer or a MAC layer is basically referred to as a TB.

In the present disclosure, hybrid automatic repeat and request (HARQ) is a kind of error control technique. HARQ acknowledgement (HARQ-ACK) transmitted on DL is used for error control of UL data, and HARQ-ACK transmitted on UL is used for error control of DL data. A transmitter performing a HARQ operation awaits reception of ACK after transmitting data (e.g., a TB or a codeword). A receiver performing a HARQ operation transmits ACK only when data has been successfully received and transmits negative ACK (NACK) when the received data has an error. Upon receipt of ACK, the transmitter may transmit (new) data, and upon receipt of NACK, the transmitter may retransmit the data. Time delay occurs until a BS receives ACK/NACK from a UE and transmits retransmission data after transmitting scheduling information and data according to the scheduling information. The time delay is generated due to channel propagation delay or time consumed for data decoding/encoding. Accordingly, if new data is transmitted after a HARQ process which is currently in progress is ended, a gap in data transmission occurs due to time delay. In order to prevent the gap in data transmission from occurring during a time delay duration, a plurality of independent HARQ processes is used. For example, when there are 7 transmission occasions between initial transmission and retransmission, a communication device may perform 7 independent HARQ processes to transmit data without any gap. A plurality of parallel HARQ processes enables successive UL/DL transmission while the device awaits HARQ feedback for previous UL/DL transmission.

In the present disclosure, CSI generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

For the background technology, terminology, and abbreviations used in the present disclosure, reference may be made to standard specifications published before the present disclosure. For example, reference may be made to the following disclosures.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2-Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP TS 23.303: Proximity-based services (Prose); Stage 2
3GPP TS 23.285: Architecture enhancements for V2X services
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3
3GPP NR
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.287: Application layer support for V2X services; Functional architecture and information flows
3GPP TS 23.501: System Architecture for the 5G System
3GPP TS 23.502: Procedures for the 5G System
3GPP TS 23.503: Policy and Charging Control Framework for the 5G System; Stage 2
3GPP TS 24.501: Non-Access-Stratum (NAS) protocol for 5G System (5GS); Stage 3
3GPP TS 24.502: Access to the 3GPP 5G Core Network (5GCN) via non-3GPP access networks
3GPP TS 24.526: User Equipment (UE) policies for 5G System (5GS); Stage 3

Overview of 3GPP System

Physical Channels and General Signal Transmission

In a radio access system, a UE receives information from a BS on DL and transmits information to the BS on UL. Information transmitted and received by the BS and the UE includes general data information and various control information, and various physical channels exist according to the type/usage of the information transmitted and received by the BS and the UE.

FIG. 1 is a diagram illustrating physical channels used in various embodiments of the present disclosure and a signal transmission method using the same.

When a UE is powered on again from a power-off state or enters a new cell, the UE performs an initial cell search procedure, such as acquisition of synchronization to a BS (S11). To this end, the UE establishes synchronization with the BS by receiving a primary synchronization channel (P-SCH) and a secondary synchronization channel (S-SCH) from the BS and acquires information such as a cell identity (ID).

Then the UE may acquire information broadcast in a cell by receiving a PBCH signal from the BS.

In the initial cell search procedure, the UE may monitor a DL channel status by receiving a DL RS.

Upon completion of the initial cell search procedure, the UE may acquire more detailed system information by receiving a PDCCH and a PDSCH according to information carried on the PDCCH (S12).

Next, the UE may perform a random access procedure in order to complete access to the BS (S13 to S16). To this end, the UE may transmit a preamble through a PRACH (S13) and receive a random access response (RAR) to the preamble through the PDCCH and the PDSCH corresponding to the PDCCH (S14). The UE may transmit a PUSCH using scheduling information in the RAR (S15) and perform a contention resolution procedure such as reception of a PDCCH signal and reception of a PDSCH signal corresponding to the PDCCH signal (S16).

Meanwhile, the random access procedure is performed in two steps, S13 and S15 may be performed as one operation in which the UE performs transmission, and S14 and S16 may be performed as one operation in which the BS performs transmission.

The UE that has performed the above-described procedure may receive a PDCCH signal and/or a PDSCH signal (S17) and/or transmit a PUSCH signal and/or a PUCCH signal (S18), as a general UL/DL signal transmission procedure.

Control information that the UE transmits to the BS is collectively referred to as UCI. The UCI includes HARQ-ACK/NACK, scheduling request (SR), CQI, PMI, and RI information.

Generally, the UCI is periodically transmitted through the PUCCH. However, when control information and data should be simultaneously transmitted, the UCI may be transmitted through the PUSCH. In addition, the UE may aperiodically transmit the UCI through the PUSCH according to the request/indication of a network.

New Radio Access Technology (NR)

As more and more communication devices demand larger communication capacity, there is a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, mMTC, ultra-reliable and low-latency communication (URLLC), and the like. In the present disclosure, such technology is referred to as NR. NR is an expression representing an example of fifth-generation (5G) RAT.

A new RAT system including NR uses an OFDM transmission scheme or a transmission scheme similar thereto. The new RAT system may follow OFDM parameters different from OFDM parameters of LTE. Alternatively, the new RAT system may follow numerology of legacy LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in the frequency domain. Different numerologies may be defined by scaling a reference subcarrier spacing to an integer N.

Figure 2:
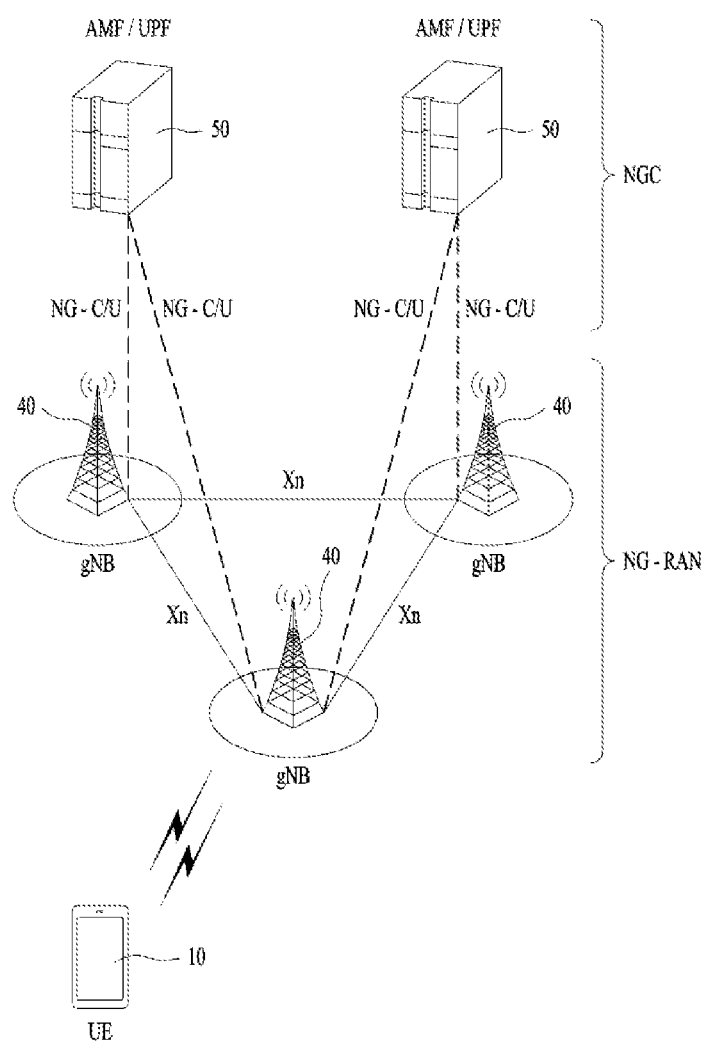
FIG. 2 illustrates the structure of an NR system.

FIG. 2 illustrates the structure of an NR system.

Referring to FIG. 2, a next-generation radio access network (NG-RAN) may include a gNB and/or an eNB that provides a UE with user plane and control plane protocol termination points. FIG. 2 shows that the NG-RAN includes only the gNB. The gNB and the eNB are connected with each other by means of an Xn interface. The gNB and the eNB are also connected to a 5G core network (5GC) by means of an NG interface. More specifically, the gNB and the eNB are connected to an access and mobility management function (AMF) by means of an NG-C interface and to a user plane function (UPF) by means of an NG-U interface.

Figure 3:
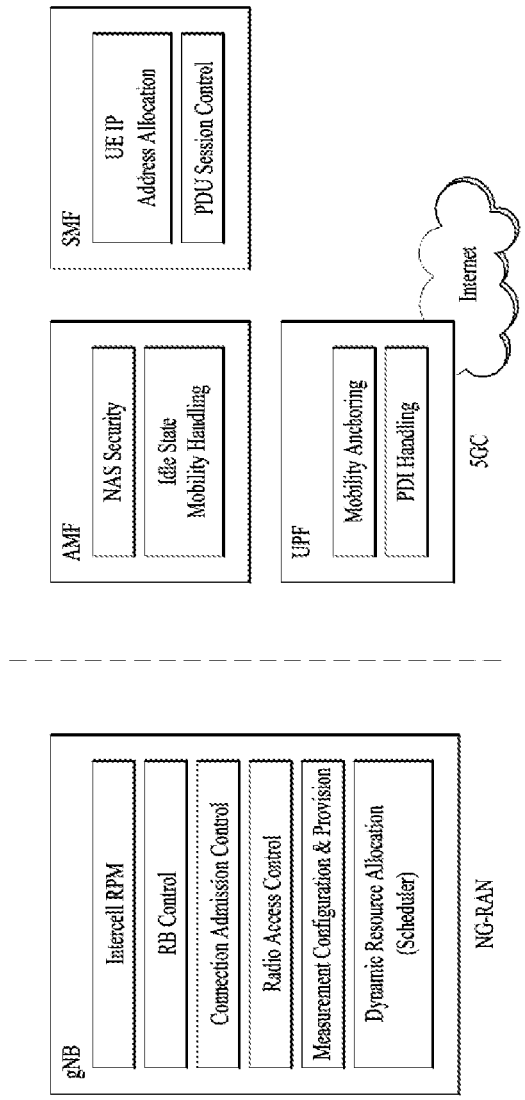
FIG. 3 illustrates functional split between an NG-RAN and a 5GC.

FIG. 3 illustrates functional split between an NG-RAN and a 5GC.

Referring to FIG. 3, a gNB may provide functions, such as intercell radio resource management (RRM), radio bearer control, connection mobility control, radio admission control, measurement configuration and provision, dynamic resource allocation, etc. An AMF may provide functions, such as NAS security, idle state mobility handling, etc. A UPF may provide functions, such as mobility anchoring, protocol data unit (PDU) handling, etc. A session management function (SMF) may provide functions, such as UE IP address allocation, PDU session control, etc.

Figure 4:
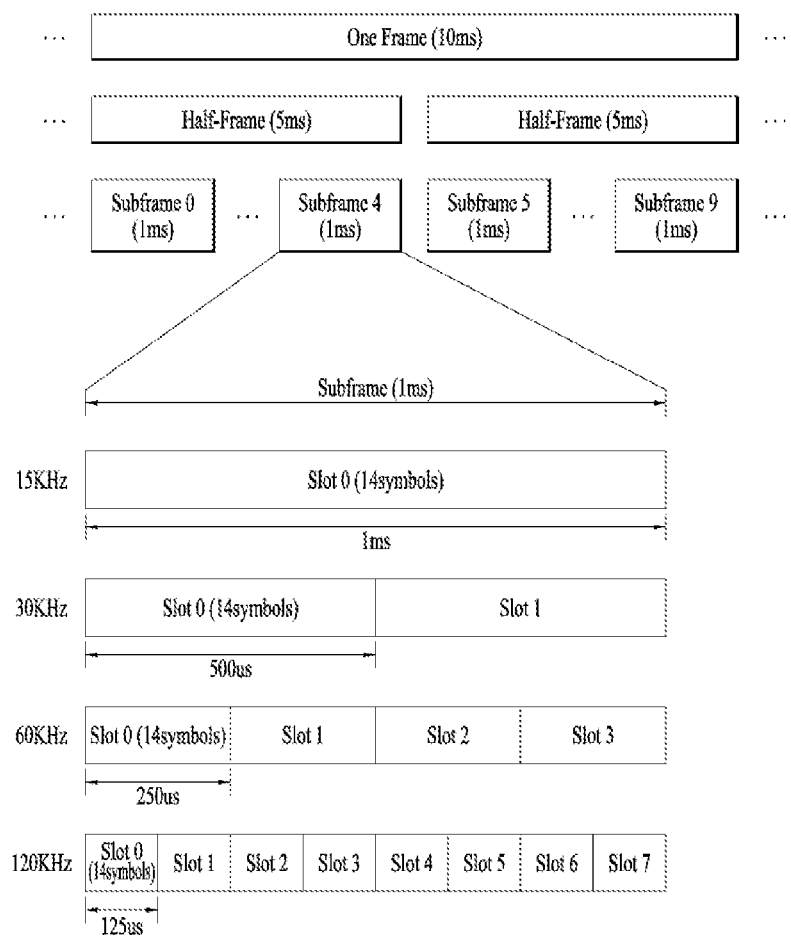
FIG. 4 illustrates the structure of an NR radio frame.

FIG. 4 illustrates the structure of an NR radio frame.

Referring to FIG. 4, a radio frame may be used for UL and DL transmission in NR. The radio frame is 10 ms long and may be defined as two half-frames (HFs), each 5 ms long. An HF may include 5 subframes (SFs), each 1 ms long. An SF may be split into one or more slots. The number of slots in the SF may be determined based on a subcarrier spacing (SCS). Each slot may include 12 or 14 OFDM(A) symbols depending on a cyclic prefix (CP).

When a normal CP is used, each slot may include 14 symbols. When an extended CP is used, each slot may include 12 symbols. Here, a symbol may include an OFDM symbol (or CP-time resource duration) or an SC-FDMA symbol (or discrete Fourier transform-spread-OFDM (DFT-s-OFDM) symbol).

Table 1 below shows the number of symbols per slot, $N^{slot}_{symb}$, the number of slots per frame, $N^{frame,u}_{slot}$, and the number of slots per subframe, $N^{subframe,u}_{slot}$, according to SCS configuration u when the normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows the number of symbols per slot, the number of slots per frame, and the number of slots per subframe according to SCS when the extended CP is used.

TABLE 2

| SCS (15*2u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, different OFDM(A) numerologies (e.g., SCSs and CP lengths) may be configured between a plurality of cells aggregated for one UE. Then, an (absolute time) duration of a time resource (e.g., a subframe, a slot, or a transmission time interval (TTI)) consisting of the same number of symbols (for convenience, referred to as a time unit (TU)) may be differently configured between the aggregated cells.

NR supports a plurality of numerologies or SCSs to support various 5G services. For example, when an SCS is 15 kHz, a wide area in traditional cellular bands may be supported. When the SCS is 30 kHz or 60 kHz, a dense-urban, lower latency, and wider carrier bandwidth may be supported. When the SCS is 60 kHz or higher, bandwidth greater than 24.25 kHz may be supported in order to overcome phase noise.

An NR frequency band defines two types of frequency ranges. The two types of frequency ranges may be FR1 and FR2. The frequency ranges may vary in number. For example, the two types of frequency ranges are shown in Table 3 below. Among the frequency ranges used in the NR system, FR1 may represent refer to "sub-6 GHz range", and FR2 may represent "above 6 GHz range" and may be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the frequency ranges of the NR system may vary in number. For example, FR1 may include a band of 410 MHz to 7125 MHz as shown in Table 4 below. That is, FR1 may include a frequency band above 6 GHz (or 5850, 5900, 5925 MHz, etc.). For example, a frequency band above 6 GHz (or 5850, 5900, 5925 MHz, etc.) included in FR1 may include an unlicensed band. The unlicensed band may be used for various purposes, for example, communication for a vehicle (e.g., a self-driving vehicle).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
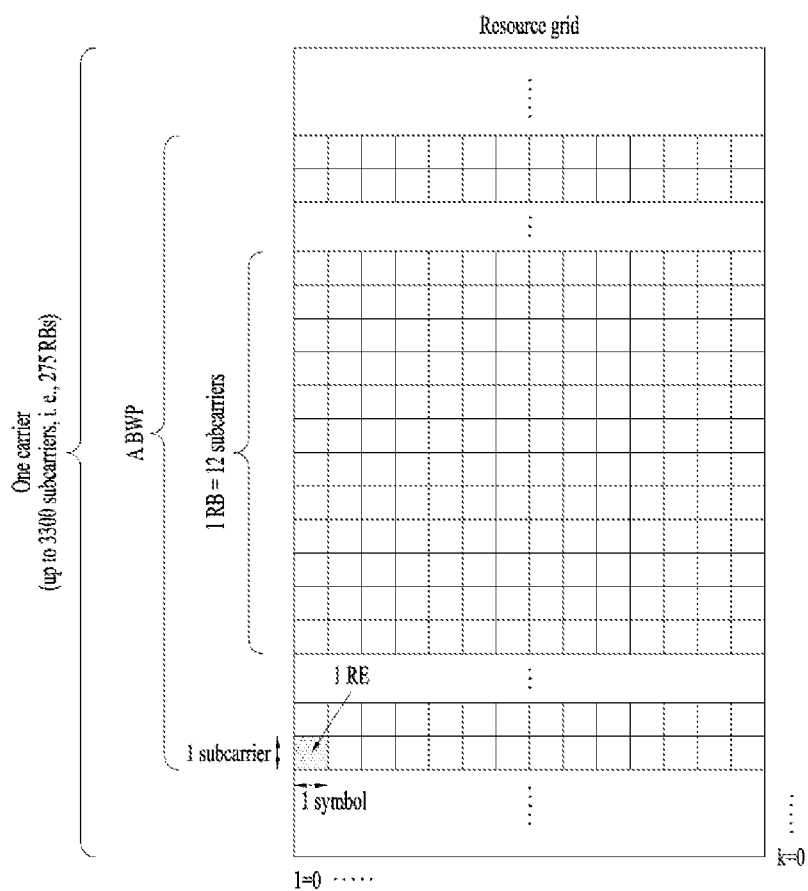
FIG. 5 illustrates a slot structure of an NR frame.

FIG. 5 illustrates a slot structure of an NR frame.

Referring to FIG. 5, a slot includes a plurality of symbols in the time domain. For example, one slot may include 14 symbols for a normal CP, whereas one slot may include 12 symbols for an extended CP. Alternatively, one slot may include 7 symbols for the normal CP, whereas one slot may include 6 symbols for the extended CP.

A carrier includes a plurality of subcarriers in the frequency domain. A resource block (RB) may be defined as multiple (e.g., 12) contiguous subcarriers in the frequency domain. A bandwidth part (BWP) may be defined as a plurality of contiguous (physical) resource blocks ((P)RBs) in the frequency domain and may correspond one numerology (e.g., SCS or CP length). The carrier may include a maximum of N (e.g., 5) BWPs. Data communication may be performed through an activated BWP. Each element may be referred to as an RE in a resource grid, and one complex symbol may be mapped to the RE.

Meanwhile, a radio interface between UEs or a radio interface between a UE and a network may consist of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
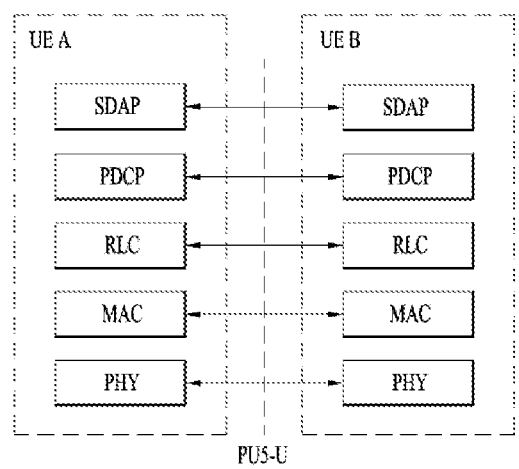
FIG. 6 illustrates a radio protocol architecture for SL communication.
Figure 6:
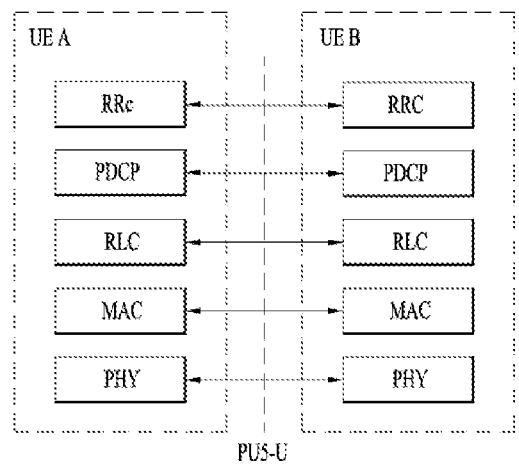

FIG. 6 illustrates a radio protocol architecture for SL communication. Specifically, FIG. 6A illustrates a user plane protocol stack of NR and FIG. 6B illustrates a control plane protocol stack of NR.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which should be first known by the UE before SL signal transmission and reception. For example, the default information may be information related to an SLSS, a duplex mode (DM), a time division duplex (TDD) UL/DL configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (S S)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured SL BWP. For example, the S-SSB may have a BW of 11 RBs. For example, the PSBCH may exist across 11 RBs. In addition, a frequency position of the S-SSB may be (pre-)configured. Accordingly, the UE does not have to perform hypothesis detection in frequencies to discover the S-SSB in the carrier.

In the NR SL system, a plurality of numerologies including different SCSs and/or CP lengths may be supported. As an SCS increases, the length of a time resource for S-SSB transmission of a transmitting UE may be shortened. Then, coverage of the S-SSB may be reduced. Accordingly, in order to ensure coverage of the S-SSB, the transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be preconfigured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be a normal CP (NCP) or an extended CP (ECP). More specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 7:
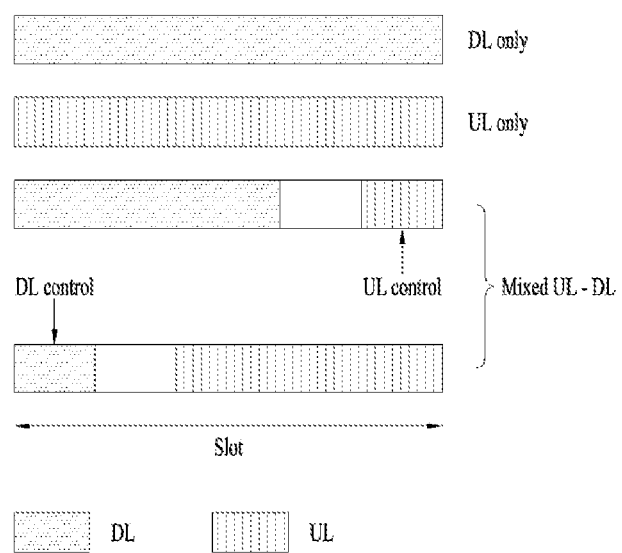
FIG. 7 illustrates the structure of a self-contained slot.

FIG. 7 illustrates the structure of a self-contained slot.

In the NR system, a frame is characterized by a self-contained structure in which all of a DL control channel, DL or UL data, and a UL control channel may be included in one slot. For example, the first N symbols (referred to as a DL control region) of a slot may be used to carry the DL control channel, and the last M symbols (referred to as a UL control region) of the slot may be used to carry the UL control channel. Each of N and M is an integer equal to or greater than 0. A resource area (referred to as a data region) between the DL control region and the UL control region may be used for DL data transmission or UL data transmission. For example, the following configurations may be considered. Each period is arranged in time order.

1. DL only configuration
2. UL only configuration
3. Mixed UL-DL configuration
   DL region+guard period (GP)+UL control region
   DL control region+GP+UL region
   DL region: (i) DL data region, (ii) DL control region+DL data region
   UL region: (i) UL data region, (ii) UL data region+UL control region A PDCCH may be transmitted in the DL control region, and a PDSCH may be transmitted in the DL data region. A PUCCH may be transmitted in the UL control region, and a PUSCH may be transmitted in the UL data region. The PDCCH may deliver DCI, for example, DL data scheduling information and UL data scheduling information. The PUCCH may deliver UCI, for example, ACK/NACK information for DL data, CSI, and an SR. The GP provides a time gap during which a BS and a UE transition from a transmission mode to a reception mode or from the reception mode to the transmission mode. Some symbols at the time of DL-to-UL switching in a subframe may be configured as the GP.

In the present disclosure, the BS may be, for example, a gNodeB.

Analog Beamforming

As a wavelength becomes short in mmW, it is possible to install a plurality of antenna elements in the same area. For example, a total of 100 antenna elements may be installed at (wavelength) intervals of 0.5 lambda in a 30-GHz band in a two-dimensional (2D) array on a panel of 5 by 5 cm. Therefore, it is considered to increase coverage or throughput by increasing beamforming (BF) gain through use of a plurality of antenna elements in mmW.

In this case, each antenna element may include a transceiver unit (TXRU) to enable adjustment of transmit power and phase per antenna element. Thereby, each antenna element may perform independent BF per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective BF is difficult because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time may be limited to B or less, which depends on how B TXRUs and Q antenna elements are connected.

Figure 8:
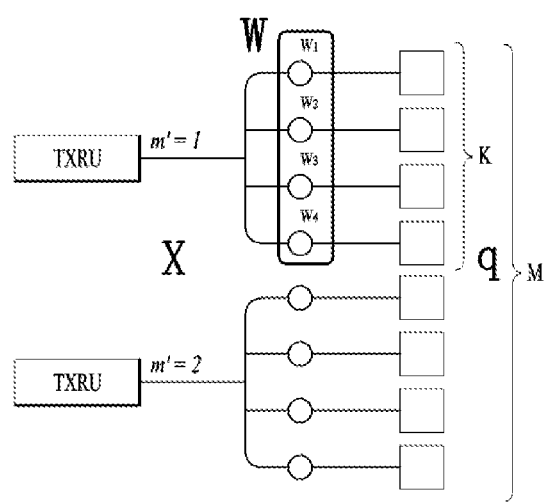
FIGS. 8 and 9 are diagrams illustrating representative methods of connecting TXRUs to antenna elements.
Figure 9:
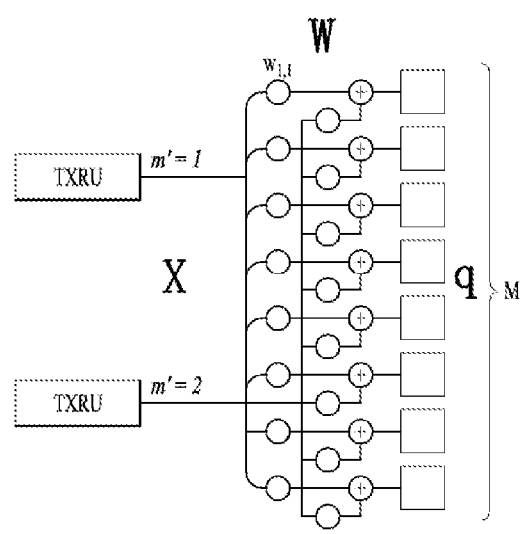

FIGS. 8 and 9 are diagrams illustrating representative methods of connecting TXRUs to antenna elements. Here, a TXRU virtualization model represents the relationship between TXRU output signals and antenna element output signals.

FIG. 8 illustrates a method of connecting TXRUs to sub-arrays. In FIG. 8, an antenna element is connected to only one TXRU.

Meanwhile, FIG. 9 illustrates a method of connecting a TXRU to all antenna elements. In FIG. 9, all antenna elements are connected to all TXRUs. In this case, separate adders are required to connect all antenna elements to all TXRUs as illustrated in FIG. 9.

In FIGS. 8 and 9, W indicates a phase vector weighted by an analog phase shifter. That is, W is a main parameter determining the direction of analog BF. In this case, the mapping relationship between CSI-RS antenna ports and TXRUs may be 1:1 or 1-to-many.

The configuration illustrated in FIG. 8 has a disadvantage in that it is difficult to achieve BF focusing but has an advantage in that all antennas may be configured at low cost.

The configuration illustrated in FIG. 9 is advantageous in that BF focusing is easily achieved. However, since all antenna elements are connected to the TXRU, the configuration has a disadvantage of increase in cost.

When a plurality of antennas is used in the NR system to which the present disclosure is applicable, the hybrid BF method obtained by combining digital BF and analog BF may be applied. In this case, analog (or radio frequency (RF)) BF means an operation in which precoding (or combining) is performed at an RF end. In the case of hybrid BF, precoding (or combining) is performed at each of a baseband end and the RF end. Thus, hybrid BF guarantees performance similar to digital BF while reducing the number of RF chains and the number of digital-to-analog (D/A) (or analog-to-digital (A/D)) converters.

For convenience of description, the hybrid BF structure may be represented by N TXRUs and M physical antennas. In this case, digital BF for L data layers to be transmitted by a transmitting end may be represented by an N*L (N by L) matrix. Thereafter, N converted digital signals are converted into analog signals by the TXRUs, and then analog BF, which may be represented by an M*N (M by N) matrix, is applied to the converted signals.

Figure 10:
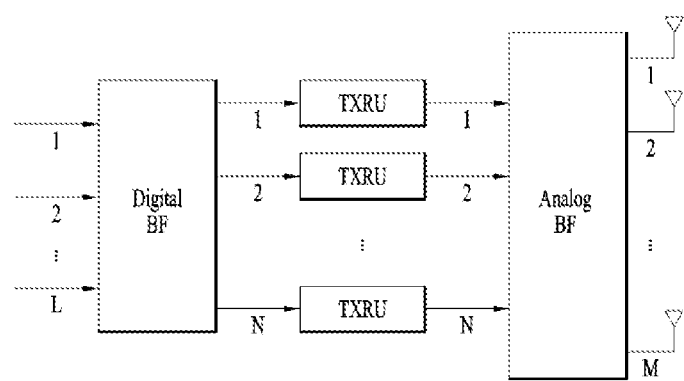
FIG. 10 is a diagram schematically illustrating a hybrid beamforming structure from the perspective of transceiver units (TXRUs) and physical antennas according to an example of the present disclosure.

FIG. 10 is a diagram schematically illustrating a hybrid BF structure from the perspective of TXRUs and physical antennas according to an example of the present disclosure. In FIG. 10, the number of digital beams is L and the number of analog beams is N.

Additionally, a method of providing efficient BF to UEs located in a specific area by designing a BS capable of changing analog BF on a symbol basis has been considered in the NR system. Further, when N TXRUs and M RF antennas are defined as one antenna panel, a method of introducing a plurality of antenna panels in which independent hybrid BF may be applied has also been considered in the NR system according to the present disclosure.

When the BS uses a plurality of analog beams as described above, each UE may have a different analog beam suitable for signal reception. Thus, a beam sweeping operation in which the BS transmits signals (at least synchronization signals, system information, paging, etc.) by applying a different analog beam to each symbol in a specific SF in order to allow all UEs to have reception opportunities has been considered in the NR system to which the present disclosure is applicable.

Figure 11:
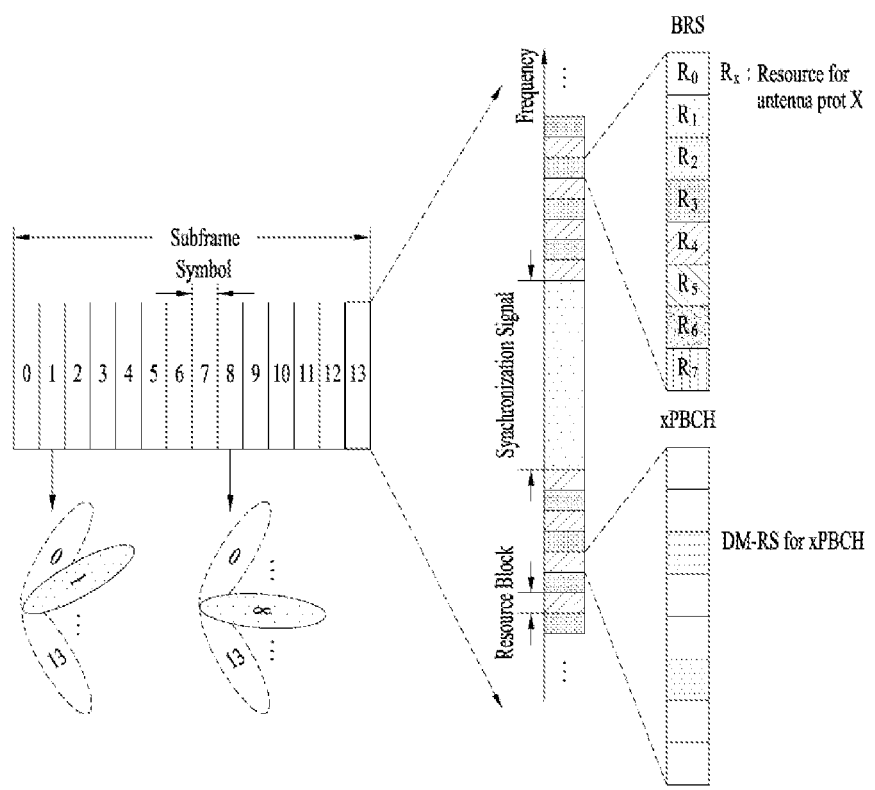
FIG. 11 is a diagram schematically illustrating a beam sweeping operation for synchronization signals and system information during a downlink (DL) transmission process according to an example of the present disclosure.

FIG. 11 is a diagram schematically illustrating a beam sweeping operation for synchronization signals and system information during a DL transmission process according to an example of the present disclosure.

In FIG. 11, a physical resource (or channel) for transmitting system information of the NR system to which the present disclosure is applicable in a broadcasting manner is referred to as a physical broadcast channel (xPBCH). In this case, analog beams belonging to different antenna panels may be simultaneously transmitted in one symbol.

In addition, the introduction of a beam reference signal (BRS) corresponding to an RS to which a single analog beam (corresponding to a specific antenna panel) is applied has been discussed as configuration for measuring a channel per analog beam in the NR system to which the present disclosure is applicable. The BRS may be defined for a plurality of antenna ports, and each BRS antenna port may correspond to a single analog beam. In this case, unlike the BRS, all analog beams in an analog beam group may be applied to the synchronization signal or xPBCH to assist a random UE in correctly receiving the synchronization signal or xPBCH.

Multiple Input Multiple Output (MIMO) RS

DMRS

A DMRS of NR is characteristically transmitted, only when necessary, to reinforce network energy efficiency and guarantee forward compatibility. Density of DMRSs in the time domain may vary according to speed or mobility of a UE. To track fast variation of a radio channel in NR, density of DMRSs in the time domain may increase.

(1) DL DMRS Related Operation

A DMRS related operation for PDSCH transmission/ reception will now be described.

A BS transmits DMRS configuration information to the UE. The DMRS configuration information may refer to a DMRS-DownlinkConfig information element (IE). The DMRS-DownlinkConfig IE may include a dmrs-Type parameter, a dmrs-AdditionalPosition parameter, a max-Length parameter, and a phaseTrackingRS parameter. The 'dmrs-Type' parameter is a parameter for selecting a DMRS type to be used for DL. In NR, the DMRS may be divided into two configuration types: (1) DMRS configuration type 1 and (2) DMRS configuration type 2. DMRS configuration type 1 has a higher RS density in the frequency domain and DMRS configuration type 2 has more DMRS antenna ports. The 'dmrs-AdditionalPosition' parameter is a parameter indicating the position of an additional DMRS on DL. The 'maxLength' parameter is a parameter indicating the maximum number of OFDM symbols for a DL front-loaded DMRS. The 'phaseTrackingRS' parameter is a parameter for configuring a DL phase tracking reference signal (PTRS).

The first position of the front-loaded DMRS is determined according to a PDSCH mapping type (Type A or Type B) and an additional DMRS may be configured to support the UE at a high speed. The front-loaded DMRS occupies one or two consecutive OFDM symbols and is indicated by RRC signaling and DCI.

The BS generates a sequence used for the DMRS based on the DMRS configuration. The BS maps the generated sequence to REs. Here, the RE may include at least one of time, frequency, an antenna port, or a code.

The BS transmits the DMRS to the UE on the REs. The UE receives the PDSCH using the received DMRS.

(2) UL DMRS Related Operation

A DMRS related operation for PUSCH reception will now be described.

The UL DMRS related operation is similar to the DL DMRS related operation, and the terms of parameters related to DL may be replaced with the terms of parameters related to UL. For example, the DMRS-DownlinkConfig IE may be replaced with a DMRS-UplinkConfig IE, the PDSCH mapping type may be replaced with a PUSCH mapping type, and the PDSCH may be replaced with a PUSCH. In the DL DMRS related operation, the BS may be replaced with the UE and the UE may be replaced with the BS.

Generation of a sequence for the UL DMRS may be differently defined depending on whether transform precoding is enabled. For example, if cyclic prefix OFDM (CP-OFDM) is used (i.e., transform precoding is not enabled), the DMRS uses a pseudo-noise (PN) sequence, and if discrete Fourier transform-spread-OFDM (DFT-s-OFDM) is used (i.e., transform precoding is enabled), a Zadoff-Chu (ZC) sequence having a length of 30 or more is used.

Overview of FDR System and Interference Element in FDR

A full-duplex radio (FDR) transmission and reception system capable of simultaneously transmitting and receiving UL and DL signals in the same frequency band may increase to a maximum of twice frequency efficiency (spectral efficiency) as compared to a legacy system for transmitting and receiving UL and DL signals based on frequency and time division and thus has been spotlighted as one of core technologies of a next-generation 5G mobile communication system.

FDR using a single frequency transmission band may be defined as a transmission resource configuration scheme for simultaneously performing transmission and reception through the single frequency transmission band from the viewpoint of an arbitrary wireless device. A special example thereof may be represented as, in wireless communication between a general BS (a relay, a relay node, or a remote radio head (RRH)) and a wireless UE, a transmission resource configuration method of simultaneously performing DL transmission and UL reception of the BS and DL reception and UL transmission of the wireless UE. Another example may be represented as a transmission resource configuration method of simultaneously performing transmission and reception between the wireless UEs in the same frequency transmission band in device-to-device direct communication (D2D) between wireless UEs. While wireless transmission and reception between the general BS and the wireless UE and proposed techniques related to FDR are described in the present disclosure, a wireless network device for performing wireless transmission and reception with a UE other than the general BS may be included in the preset disclosure and direct communication between UEs may also be included.

Figure 12:
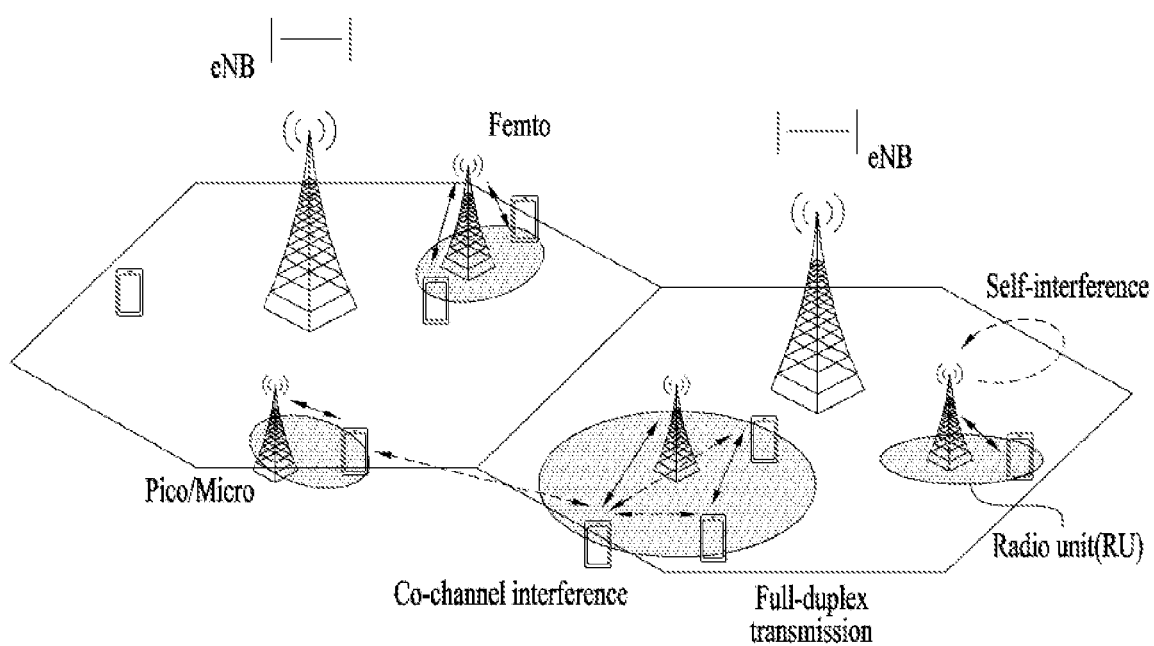
FIG. 12 is a conceptual diagram of a UE and a BS that support full-duplex radio (FDR)

FIG. 12 is a conceptual diagram of a UE and a BS that support FDR.

In an FDR situation illustrated in FIG. 12, the following three types of interference are produced.

Intra-device self-interference: Because transmission and reception are performed on the same time and frequency resources, a desired signal and a signal transmitted from the BS or UE are received at the same time at the BS or UE. The transmitted signal is received with almost no attenuation at a reception antenna of the BS or UE, and thus with much larger power than the desired signal. As a result, the transmitted signal serves as interference.

UE-to-UE inter-link interference: A UL signal transmitted by the UE is received at an adjacent UE and thus serves as interference.

BS-to-BS inter-link interference: The BS-to-BS inter-link interference refers to interference caused by signals that are transmitted between BSs or heterogeneous BSs (a picocell, a femtocell, and a relay) in a heterogeneous network (HetNet) state and received by a reception antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

Figure 13:
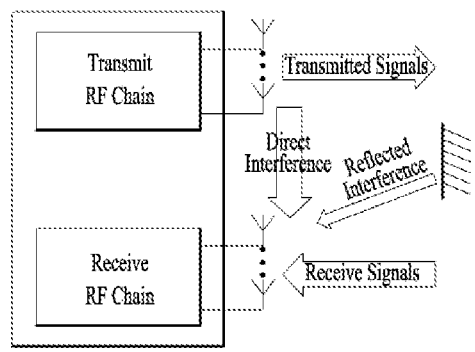
FIG. 13 is a diagram illustrating the concept of a transmission/reception link and self-interference (SI) in an FDR communication situation.

FIG. 13 is a diagram illustrating the concept of a transmission/reception link and SI in an FDR communication situation.

As illustrated in FIG. 13, SI may be divided into direct interference caused when a signal transmitted from a transmit (Tx) antenna directly enters a receive (Rx) antenna without path attenuation, and reflected interference reflected by peripheral topology. The level of SI is dramatically higher than a desired signal due to a physical distance difference. Due to the dramatically large interference intensity, efficient SI cancellation is necessary to operate the FDR system.

To effectively operate the FDR system, self-interference cancellation (self-IC) requirements with respect to the maximum transmission power of devices (in the case in which FDR is applied to a mobile communication system (bandwidth (BW)=20 MHz)) may be determined as illustrated in Table 5 below.

Types of Self-IC Schemes and Methods of Applying Self-IC Schemes

Figure 14:
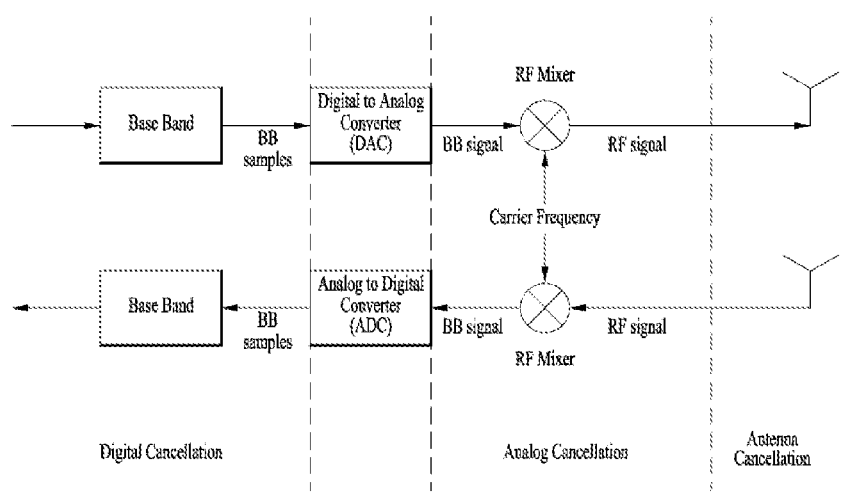
FIG. 14 is a diagram illustrating positions at which three self-IC schemes are applied, in a radio frequency (RF) transmit/receive end (or an RF front end) of a device.

FIG. 14 is a diagram illustrating positions at which three self-IC schemes are applied, in an RF Tx/Rx end (or an RF front end) of a device. Hereinafter, a brief description will be given of the three self-IC schemes.

Antenna self-IC: Antenna self-IC is a self-IC scheme that should be performed first among all self-IC schemes. SI is cancelled at an antenna end. Most simply, transfer of an SI signal may be physically blocked by placing a signal-blocking object between a Tx antenna and an Rx antenna, or a part of an SI signal may be canceled by artificially controlling the distance between antennas using multiple antennas or by inverting a phase of a specific Tx signal. Further, a part of an SI signal may be cancelled by means of multiple polarized antennas or directional antennas.

Analog self-IC: Interference is canceled at an analog end before an Rx signal passes through an ADC. An SI signal is canceled using a duplicated analog signal. This operation may be performed in an RF region or an intermediate frequency (IF) region. A specific SI signal cancellation method is described below. A duplicate of an actually received SI signal is generated by delaying an analog Tx signal and then controlling the amplitude and phase of the delayed Tx signal, and the duplicate signal is subtracted from a signal received at an Rx antenna. However, due to analog signal-based processing, the resulting implementation complexity and circuit characteristics may cause additional distortion, thereby significantly changing IC performance.

Digital self-IC: Interference is canceled after an Rx signal passes through an ADC. Digital self-IC covers all IC techniques performed in a baseband region. Most simply, a duplicate of an SI signal is generated using a digital Tx signal, and the duplicate signal is subtracted from an Rx digital signal. Alternatively, techniques of performing precoding/postcoding in a baseband using multiple antennas so that a Tx signal of a UE or a BS may not be received at an Rx antenna may be classified as digital self-IC. However, since digital self-IC is performed only when a digital modulated signal is quantized to a level sufficient to recover information of a desired signal, there is a need for the prerequisite that the difference between signal powers of an

TABLE 5

| Node Type | Max. Tx Power ($P_A$) | Thermal Noise. (BW = 20 MHz) | Receiver NF | Receiver Thermal Noise Level | Self-IC |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 5, it may be noted that, to effectively operate the FDR system in a 20-MHz BW, the UE needs 119-dBm self-IC performance. A thermal noise value may be changed to $N_{0,BW}$=−174 dBm+10×$\log_{10}$(BW) according to the BW of the mobile communication system. In Table 5, the thermal noise value is calculated on the assumption of a 20-MHz BW. In relation to Table 5, for a receiver noise figure (NF), a worst case is considered with reference to the 3GPP specification requirements. A receiver thermal noise level is determined to be the sum of a thermal noise value and a receiver NF in a specific BW.

interference signal remaining after IC using one of the above-described techniques and a designed signal should fall into an ADC range in order to perform digital Self-IC.

Figure 15:
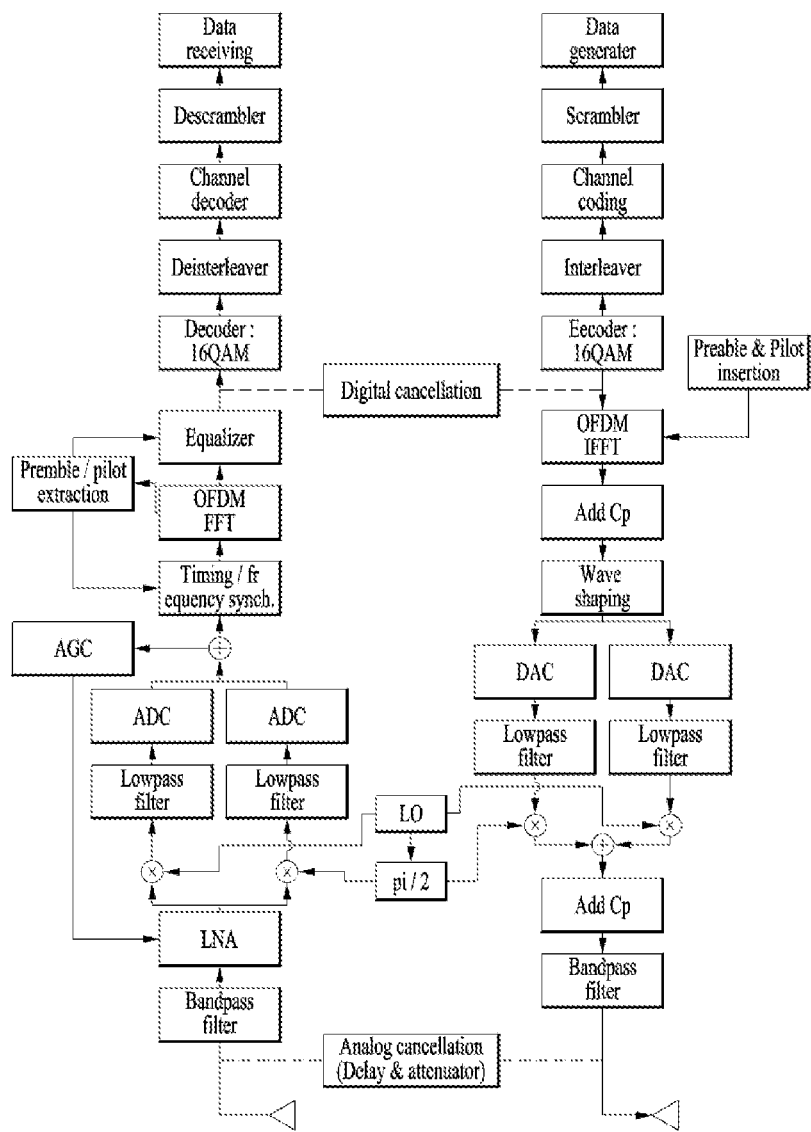
FIG. 15 is a block diagram of a self-interference cancellation device in a proposed communication apparatus in an OFDM communication environment based on FIG. 14.

FIG. 15 is a block diagram of a self-IC device in a proposed communication apparatus in an OFDM communication environment based on FIG. 14.

While FIG. 15 shows that digital self-IC is performed using digital SI signal information before digital-to-analog conversion and after analog-to-digital conversion, digital self-IC may be performed using a digital SI signal after inverse fast Fourier transform (IFFT) and before fast Fourier transform (FFT). In addition, although FIG. 15 is a conceptual diagram of self-IC though separation of a Tx antenna and an Rx antenna, if antenna IC is performed using a single antenna, an antenna configuration scheme may be different from antenna configuration of FIG. 15. A functional block may be added to or removed from the self-IC device of FIG. 15 according to purpose.

Signal Modeling of FDR System

Since the FDR system uses the same frequency between a Tx signal and an Rx signal, non-linear components in RF significantly affect the Tx and Rx signals. In particular, the Tx signal is distorted by non-linear properties of active elements such as a power amplifier (PA) of a Tx RF chain and a low-noise amplifier (LNA) of an Rx RF chain, such distortion may be modified by a mixer in the Tx/Rx RF chain. Due to such distortion, the Tx signal may be modeled as generation of components corresponding to a high order. Components corresponding to an even order among the high-order components have influence on the vicinity of direct current (DC) and a high frequency region corresponding to several multiples of a center frequency and thus may be efficiently cancelled using an existing alternating current (AC) coupling or filtering scheme. However, components corresponding to an odd order are generated in the vicinity of a center frequency and thus cannot be easily cancelled unlike the even order components, thereby having a significant influence on reception. In consideration of non-linear properties of the odd-order components, an Rx signal subjected to ADC in the FDR system may be expressed using the Parallel Hammerstein (PH) model as shown in Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad [\text{Equation 1}]$$

where $x_D(n)$ denotes data to be received, $h_D(n)$ denotes a desired channel experienced by data to be received, $x_{SI}(n)$ denotes data transmitted by a Tx end, $h_{SI,k}(n)$ denotes a self-channel experienced by data transmitted by the Tx end and indicates a linear component for k=1 and a non-linear component fork having an odd number of 3 or more, and $z(n)$ denotes additive white gaussian noise (AWGN).

Figure 16:
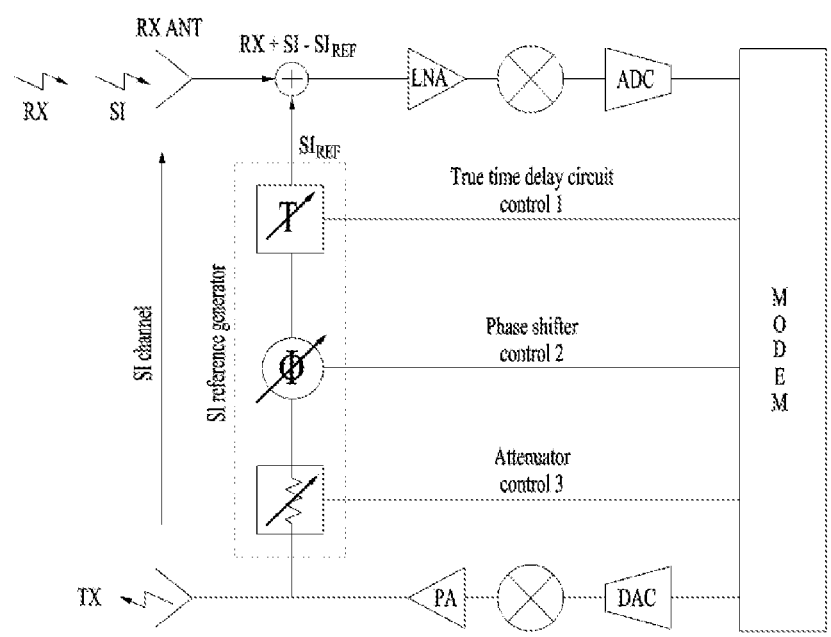
FIG. 16 is a diagram illustrating an RF chain of a communication device for performing general FDR technology.

FIG. 16 is a diagram illustrating an RF chain of a communication device for performing general FDR technology.

In order to cancel an SI signal in a communication device using FDR, it is necessary to generate a duplicate signal, which is exactly identical to the SI signal, (hereinafter, an SI RS). Referring to FIG. 16, for cancellation of the SI signal, a method of subtracting the SI RS $SI_{REF}$ from the SI signal before an Rx signal arrives at an LNA of an Rx end of the RX chain is generally used. In order to generate the SI RS $SI_{REF}$, a communication device branches a Tx signal of a Tx end (the Tx signal is branched after passing through a PA of the Tx end in FIG. 16) and causes a portion of the Tx signal to pass through an SI reference generator including an attenuator, a phase shifter, and a true time delay circuit. The SI reference generator generates the SI RS to copy an SI channel using the branched Tx signal. In order for the SI reference generator to copy the SI channel, a channel through which the SI signal is received is separately estimated.

The communication device may estimate the SI channel and then generate a control signal input to the true time delay circuit, a control signal input to the phase shifter, and a control signal input to the attenuator. In this case, the communication device should be in a state in which all of the SI RS and a desired Rx signal are not received.

The communication device may control the SI reference generator using two methods.

According to the first method, in order to separately estimate the channel through which the SI signal is received, the communication device may stop performing communication and transmit an SI channel estimation signal (e.g., a pilot signal, an RS, etc.) in an allocated communication band (or a channel band), and the SI reference generator may copy the SI signal using information about the SI channel estimation signal upon communication.

According to the second method, the communication device may transmit the SI channel estimation signal (e.g., an RS, a pilot signal, a tone, etc.) carried in both ends (e.g., a guard band) of a communication channel band and control the SI reference generator so as to reduce power of the corresponding SI channel estimation signal according to an adaptive feedback algorithm.

In the first method, it is necessary to first estimate the SI channel in order to find an optimized state of the SI reference generator. To this end, an Rx device (or an Rx side) as well as a Tx device (or a Tx side) should stop performing communication. In addition, even though perfect SI channel estimation is performed, a channel of an SI reference path needs to be very precisely calibrated. The channel of the SI reference path should be configured through a lookup table based on a combination of all control voltages. Even when the lookup table is accurately composed using a specific Tx power and temperature, the lookup table is supposed to change depending on an original Tx power and a temperature of a circuit. Hence, SI signal cancellation performance is inevitably degraded due to a calibration error and a difference in condition between a current Tx power and temperature and a Tx power and temperature at the timing of composing the lookup table. Moreover, it is difficult for the lookup table to follow an SI signal channel (or SI channel) that changes depending on time.

In the second method, since the communication device may transmit the SI channel estimation signal (the tone, pilot signal, RS, etc.) carried in both sides of a communication band without stopping performing communication and continuously control the SI reference generator in time using the adaptive feedback algorithm, calibration of the SI reference generator is unnecessary. However, since the SI reference generator is controlled using a tone of a guard band in both sides of the communication band, instead of using the communication band, an SI signal caused by transmission of a tone inside the communication band, which is most important, is not cancelled.

Figure 17:
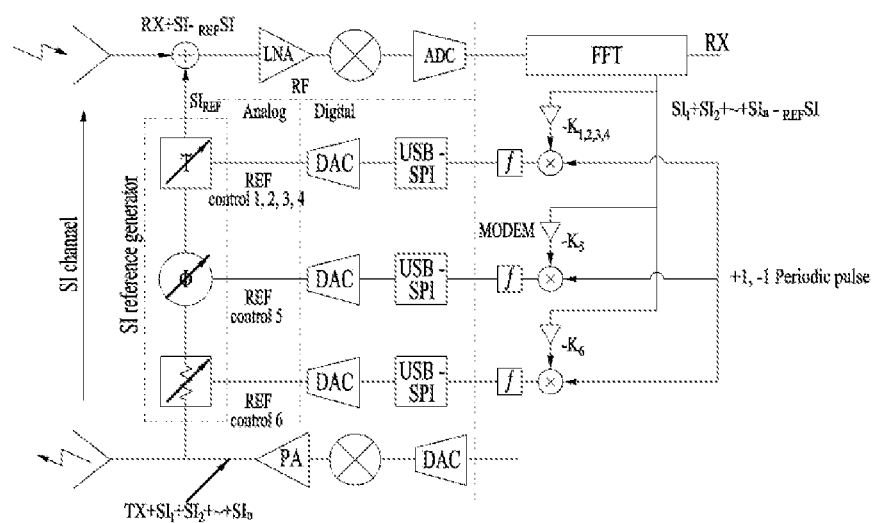
FIG. 17 is a diagram illustrating an example of an RF chain structure of a communication device for cancelling an SI signal when an FDR scheme is used.

FIG. 17 is a diagram illustrating an example of an RF chain structure of a communication device for cancelling an SI signal when an FDR scheme is used.

Referring to FIG. 17, the RF chain of the communication device may include a communication modem (or a modem), an SI reference generator, a Tx antenna, an Rx antenna, etc. The communication modem may include a fast Fourier transform (FFT) unit and integrators. The SI reference generator may include an attenuator, a phase shifter, and a true time delay circuit.

To precisely generate (or duplicate) an SI RS, the SI reference generator may control all of the attenuator, the phase shifter, and the true time delay circuit in an analog manner. To this end, the RF chain may include digital-to-analog converters (DACs) that convert control signals transmitted by the communication modem (or modem) into analog signals.

According to the concept of a true time delay defined basically as a slope of phase shift to a frequency band, since the true time delay circuit is incapable of controlling the true time delay only with information about a single frequency, it is necessary to obtain information about at least two frequencies in order to perform SI signal cancellation in a wide band. Therefore, it is assumed that two or more pilot signals, two or more RSs, or two or more tones, which are test signals, are transmitted.

In order to control the SI reference generator, how to use multiple RSs (or multiple tones, multiple pilot signals, etc.), which are test signals, is described. First of all, the communication modem (or modem) shown in FIG. 17 may monitor a sum of powers of the multiple tones in frequencies in which the multiple tones corresponding to the test signals are located, measure respective powers at the frequency positions at which the multiple tones are transmitted to calculate the sum of the measured powers. Here, the powers measured at the frequency positions of the transmitted tones correspond to powers of SI signals.

The communication modem may transmit a control signal for minimizing a difference between the sum of the powers of the SI signals based on the multiple tones and a power of the SI RS. Namely, the communication modem may feed back a control signal for causing the sum of the powers of the SI signals based on the multiple tones to be minimum to the SI reference generator. The SI reference generator generates the SI reference signal according to the fed-back control signal. To control the sum of the measured powers of the SI signals, the communication modem may generate an SI RS having a power value closest to this sum.

The communication modem may control the SI reference generator using an adaptive feedback loop until the sum $(SI=SI_1+SI_2+SI_3+ \ldots +SI_n)$ of the powers of the SI signals is minimized. Here, $SI_n$ is a power of an SI signal measured at a frequency position at which an n-th RS among a plurality of RSs is transmitted. The communication modem uses a periodic pulse signal of +1 and −1 to change a sign of an increment of a controlled bias voltage using a loop function of adaptive feedback. The loop function means a function for searching for surroundings of a current variable in a feedback loop including a variable to be controlled.

The communication modem may feed back control signals to the phase shifter, the attenuator, and the true time delay circuit, respectively, using the adaptive feedback loop so as to enable the SI reference generator to generate an SI RS having a power closest to the sum of the powers of the SI signals.

The method of controlling the SI RS according to FIG. 17 is advantageous in that complicated channel estimation and calibration are not required because the adaptive feedback algorithm is operated only with the sum of the powers of the multiple tones.

Figure 18:
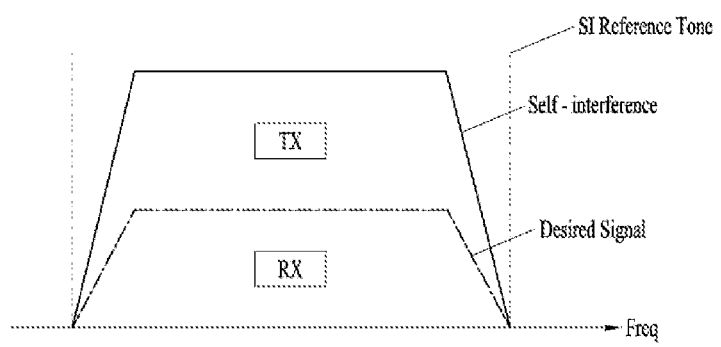
FIG. 18 is a diagram illustrating two tones transmitted in both sides of a communication band to control an SI reference generator.

FIG. 18 is a diagram illustrating two tones transmitted in both sides (e.g., a guard band) of a communication band to control an SI reference generator.

Referring to FIG. 18, SI channel estimation tones are included in both sides (a guard band) of the communication channel band and the SI reference generator may be controlled so as to reduce powers of the SI channel estimation tones according to the adaptive feedback algorithm. Then, a desired signal from which SI is cancelled may be stably received.

As demand for data has been remarkably increased, application of BF technology and FDR technology is under discussion in mobile communication. As use of a ultra-high frequency signal band is gradually considered, studies are conducted to widen a propagation arrival distance by overcoming a disadvantage of path loss of an ultra-high frequency signal using the BF technology and to increase communication capacity by applying the FDR technology. In an FDR environment, as a BS and a UE simultaneously perform Tx and Rx operations, there are the influence of cross-link interference (CLI), which is external interference caused by a neighboring communication device, and the influence of SI, which is interference of a self-Tx signal affecting a receiver of a self-communication device.

External interference signals corresponding to CLI have an effect on a receiver with different signal strengths according to the number of antennas used in each device, Tx signal strength, and/or a distance between devices. Since SI corresponding to an internal interference factor has a much shorter Tx and/or Rx distance than a desired signal or external interference factors and has a fixed Tx and/or Rx distance, SI has a probability of being received with a larger strength than an Rx signal. If BF technology is applied in this environment, Tx and/or Rx beam gain is added to the strength of an internal/external interference signal, thereby further aggregating the influence of interference. Therefore, an additional circuit or algorithm for reducing the influence of the internal/external interface factors needs to be applied to the receiver.

There is a probability of reducing the influence of interference even in the RF domain. If BF technology is applied, since a signal may be spatially split by adjusting a Tx and/or Rx beam pattern and then be transmitted and received, the influence of interference may be reduced without implementing the additional circuit. However, in a situation in which performance of the receiver is greatly affected by interference, if a legacy BF scheme in a half-duplex mode for maximizing beam gain with respect to a desired signal is used without change, since a beam considering the influence of an interference signal may not be formed, the quality of Rx performance is degraded and stability of Rx performance may not be guaranteed. Accordingly, as signals in the same frequency band are simultaneously transmitted and received in a legacy FDR communication system, a Tx signal serves as interference in a receiver and therefore a method of minimizing the influence of such interference is needed.

Interference signals result in deterioration in Rx performance of the receiver. If Tx and Rx BF technology is applied, such a problem is expected to be solved. However, when the BF technology is applied, if an existing BF scheme for maximizing beam gain for a desired signal is used without change, since a beam considering the influence of an interference signal may not be formed, the quality of Rx performance is degraded and stability of Rx performance may not be guaranteed. Therefore, a beam management/tracking procedure capable of efficiently reducing the influence of interference is needed and a mechanism for stably operating a link in consideration of a desired signal and an interference signal is needed. That is, a beam management/tracking method of considering the influence of interference is needed in the FDR environment to apply the BF technology and to reduce interference without an additional circuit.

The present disclosure proposes a method capable of stably operating a link through beam direction and weight adjustment to reduce the influence of an interference signal in the RF domain without implementing an additional circuit at a Rx end by applying BF technology in an FDR environment.

Figure 19:
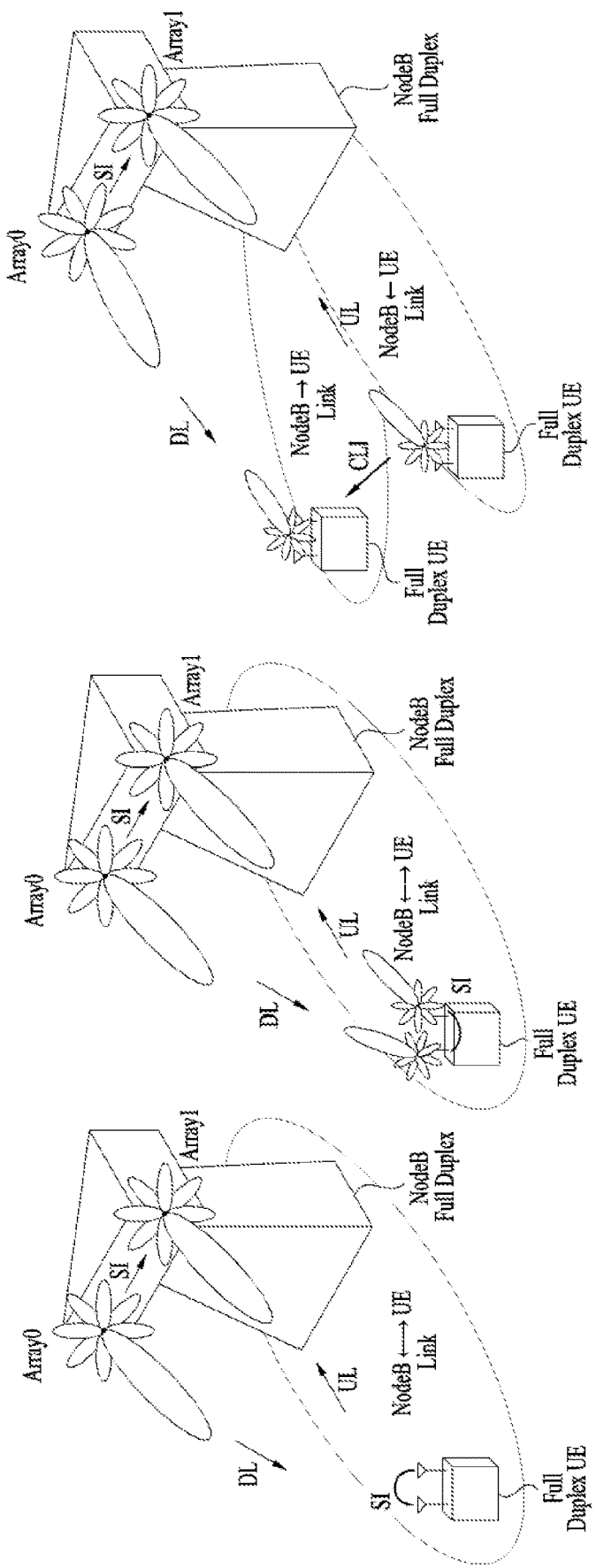
FIG. 19 is a diagram illustrating examples of a communication system structure to which beamforming technology is applied in an FDR environment.
Figure 20:
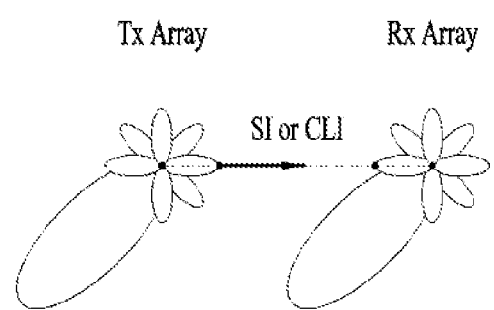
FIG. 20 is a diagram illustrating an example of the influence of SI/cross-link interference (CLI) when BF is applied in the FDR environment.

FIG. 19 is a diagram illustrating examples of a communication system structure to which BF technology is applied in an FDR environment. FIG. 20 is a diagram illustrating an example of the influence of SI/CLI when BF is applied in the FDR environment. In FIG. 19, a link with a UE in coverage of one BS is illustrated, and it is assumed that the BS uses 2 phased antenna arrays and each array is capable of independently operating DL/UL in a different way. Accordingly, Tx and Rx situations of the communication system in which each array is capable of operating a full-duplex mode by differently performing Tx and Rx BF are illustrated. Corresponding scenarios are purely exemplary and scenarios in which the BS/UE operates three or more arrays may also be considered. A situation in which the full-duplex mode is used in all communication devices or a situation in which various links are present may be considered. In the present disclosure, a beam tracking operation is described based on a scenario in which two arrays of the BS in the full-duplex mode are differently operated on UL and DL, respectively.

In a system structure in which respective arrays are differently operated on DL and UL using multiple antenna arrays in the FDR environment like the scenarios illustrated in FIG. 19, a signal of a Tx array may function as interference with respect to an Rx array. In particular, in a situation in which sidelobes of a direction affecting SI/CLI in each pattern of Tx and Rx arrays are aligned to be overlapped as illustrated in FIG. 20, the influence of interference may be maximized, thereby adversely affecting a link between the BS and the UE. Since the influence of such interference depends on each beam pattern shape of Tx and Rx arrays, a method of forming a beam pattern is needed so as to reduce the influence of interference without greatly affecting link quality between the BS and the UE.

Figure 21:
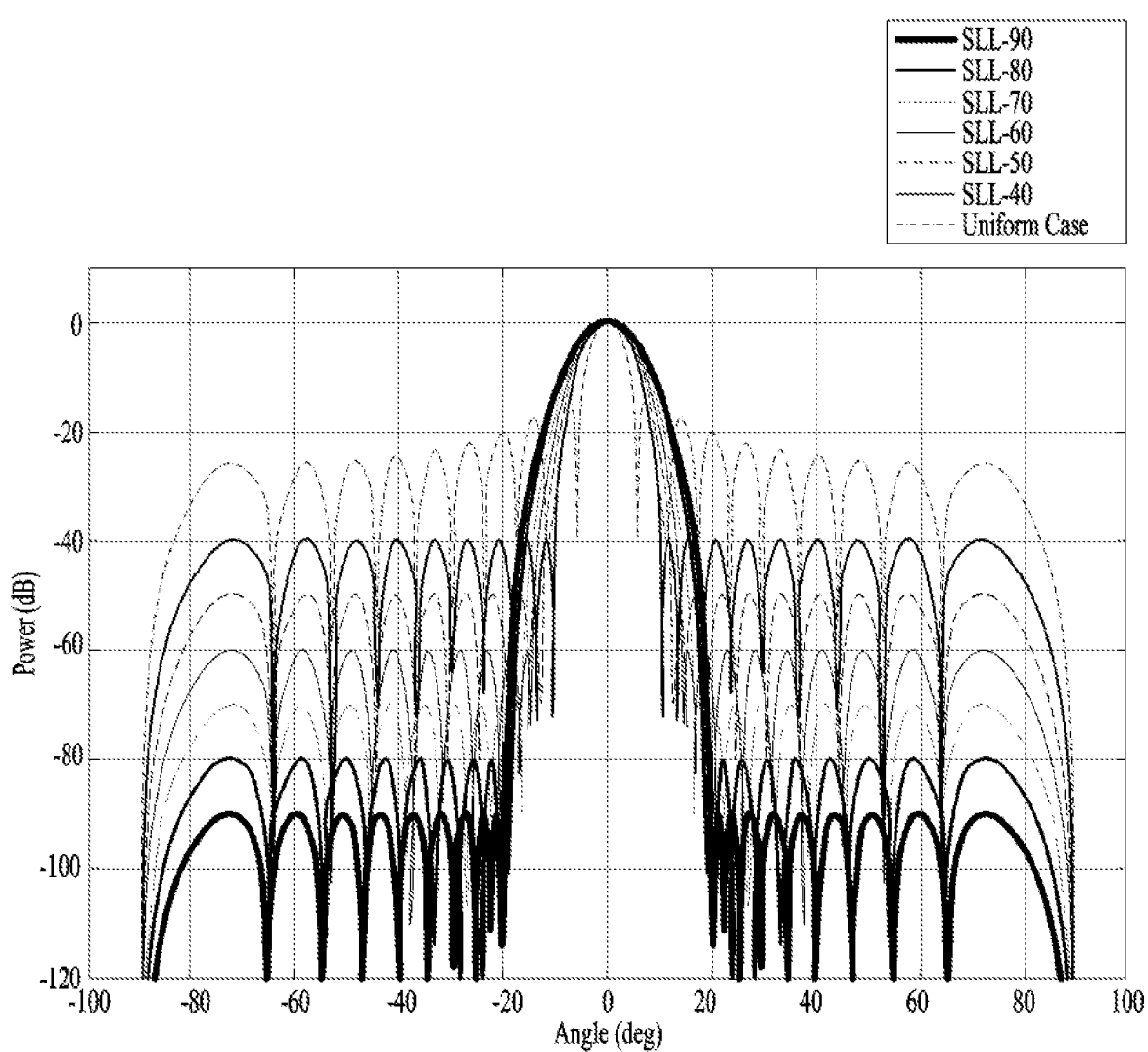
FIG. 21 is a diagram illustrating an example of beam patterns of a uniform linear array (ULA) structure to which a weight is applied using a Dolph-Chebyshev filter.

The beam pattern may be formed as a different shape according to a physical structure of an array and to a beam adjustment weight. The physical structure of the array is determined in a process of manufacturing an antenna and a characteristic of an array beam is fixed unless an antenna is physically movable. Therefore, after the physical structure of the array is determined, the characteristic of the beam may be modified by controlling the beam adjustment weight. FIG. 21 is a diagram illustrating an example of beam patterns of a uniform linear array (ULA) structure to which a weight is applied using a Dolph-Chebyshev filter.

Specifically, FIG. 21 illustrates beam patterns of the ULA structure in which 20 antenna arrays are located at an interval of $\lambda/2$. In FIG. 21, the beam patterns of the ULA structure for maximizing beam gain in a direction of 0° in the range of azimuth angles from −90° to 90° are illustrated. The beam patterns include a beam pattern of the case in which the magnitude of a weight for each antenna is constant and beam patterns of the case in which weights are applied using the Dolph-Chebyshev filter so as to lower a sidelobe level (SLL) from −40 dB to −90 dB in units of 10 dB.

As is confirmed from FIG. 21, when weights are applied using the Dolph-Chebyshev filter, all sidelobe peak levels of the beam patterns may be equally formed at desired levels. It is also confirmed that a beam width of a main lobe is widened as a difference between a main lobe peak level and an SLL is increased. In other words, the SLL has a characteristic of having a trade-off relation with a beam width of the main lobe.

Basically, as the number of antennas used in an array is increased, the number of lobes is increased and the beam width of each lobe becomes smaller so that spatial resolution is raised. As a used frequency band is a higher, the size of an antenna array may be reduced and thus the number of antennas available in a limited space is increased. Therefore, it is expected in an ultra-high frequency band to compensate for a shortcoming of a wide beam width caused by reduction of the SLL by increasing the number of available antennas.

In order to use such a characteristic of the beam pattern using the Dolph-Chebyshev filter to reduce the influence of interference, a rule indicating that an interference signal should be received through a sidelobe should be observed. Accordingly, when a scheme proposed in the present disclosure is used, the following two perspectives should be considered. First, an antenna array of a communication device should be located such that SI is not directed to a main lobe. A direction that SI affects differs according to a physical location of an array of multiple antennas and SI is always received in a fixed direction. Accordingly, if an SI Rx direction is fixed so as not to be received through the main lobe, an interference level may be adjusted by adjusting the SLL. Second, when a weight for lowering the influence of interference in the sidelobe is adjusted, the SLL should be adjusted so as not to increase the strength of interference occurring in a widened beam width of the main lobe. These considerations may be solved in terms of operation by observing and operating a measurement value of interference. Consequently, it is important to adjust a beam weight so as to reduce the influence of interference.

Figure 22:
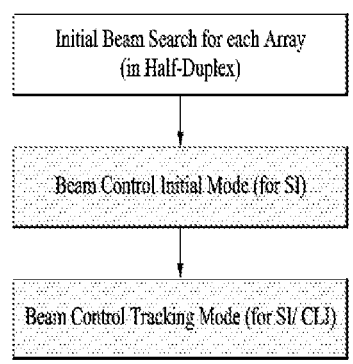
FIG. 22 is a diagram illustrating a procedure of reducing the influence of interference and selecting a modulation and coding scheme (MCS) using beam direction and weight adjustment proposed in the present disclosure.

The present disclosure proposes a method of applying a beam pattern using a characteristic of a Dolph-Chebyshev weight and beam direction adjustment so that the influence of an interference signal becomes less than a predetermined level relative to a desired signal. FIG. 22 is a diagram illustrating a procedure of reducing the influence of interference and selecting a modulation and coding scheme (MCS) using beam direction and weight adjustment proposed in the present disclosure.

Referring to FIG. 22, it may be appreciated that the proposed method is applied after search for initial beam information in a half-duplex mode is performed and that there are two modes, i.e., an initial mode and a tracking mode. Since an Rx direction of an SI signal is fixed if a physical structure of an antenna is determined, a beam weight is adjusted to offset an SI level such that maximum MCS performance is produced in the initial mode and then a beam direction and weight are adjusted in consideration of both SI and CLI in the tracking mode.

Finally, through the proposed method of the present disclosure, measurement values for a desired signal in the BS and the UE and for SI/CLI are obtained and a beam direction and weight are selected based on the measurement values. The tracking mode proposed in the present disclosure is repeatedly and periodically performed so that a beam pattern is adjusted to follow a real-time channel situation.

In the present disclosure, it is proposed that the weight be prepared as table information. Since it is difficult to determine a connected element about how to calculate the weight based on an interference measurement value to lower an interference level to a desired level, a method using a calculation equation has difficulty in being actually applied. In addition, complexity is increased when the weight for lowering an interference level to a desired level is calculated in real time and is applied. Further, as the number of antennas is increased, complexity is further increased.

Therefore, it is proposed to compose and operate weight table information. Table 6 below shows an example of the weight table information.

TABLE 6

| Weight Index | MLL-SLL [dB] | HPBW [degree] | W(0) | W(1) | ... | W(n − 1) |
|---|---|---|---|---|---|---|
| 0 | 0 | 4 | a | aa | ... | aaa |
| 1 | 1 | 4 | b | bb | ... | bbb |
| 2 | 2 | 4 | c | cc | ... | ccc |
| 3 | 3 | 5 | d | dd | ... | ddd |
| ... | ... | ... | ... | ... | ... | ... |
| ... | ... | ... | ... | ... | ... | ... |
| 20 | 20 | 6 | f | ff | ... | fff |
| ... | ... | ... | ... | ... | ... | ... |
| 60 | 60 | 8 | g | gg | ... | ggg |
| ... | ... | ... | ... | ... | ... | ... |
| 90 | 90 | 10 | y | yy | ... | yyy |
| ... | ... | ... | ... | ... | ... | ... |

The table information of Table 6 may include a total of 3 pieces of information, i.e., a peak level difference value MLL-SLL between a main lobe and a sidelobe, a half-power beam width HPBW, a weight coefficient value W to be applied to each of n antenna elements. The present disclosure proposes that a weight index be mapped to MLL-SLL in one-to-one correspondence. Since the value of MLL-SLL is adjustable as a weight index value, this scheme has an advantage in that an interference level of each SI/CLI may be expressed as a number so as to be set to a desired level and calculation is not needed. For example, in order to lower an interference level of a sidelobe by 1 dB, the weight index value needs to be raised by 1. In the above example, although the table is defined by setting an adjustment step size of MLL-SLL to 1 dB, the weight table may be defined by setting the adjustment step size of MLL-SLL to be narrower in consideration of receiver performance.

However, in the proposed scheme, as the weight index is increased, there is a phenomenon in which the SLL is lowered and the beam width of the main lobe is increased, due to a characteristic of the Dolph-Chebyshev filter. Accordingly, if a beam tracking operation is performed while increasing the weight index value, the beam width of the main lobe is widened so that a situation in which an interference signal is located in the main lobe may occur. In this case, the influence of interference of a receiver may be further increased as opposed to intention. Therefore, in order not to further increase the influence of interference as compared with the case in which an interference signal is present within the SLL, there is a limitation in that the weight index value should be adjusted so as not to be included in the main lobe.

Figure 23:
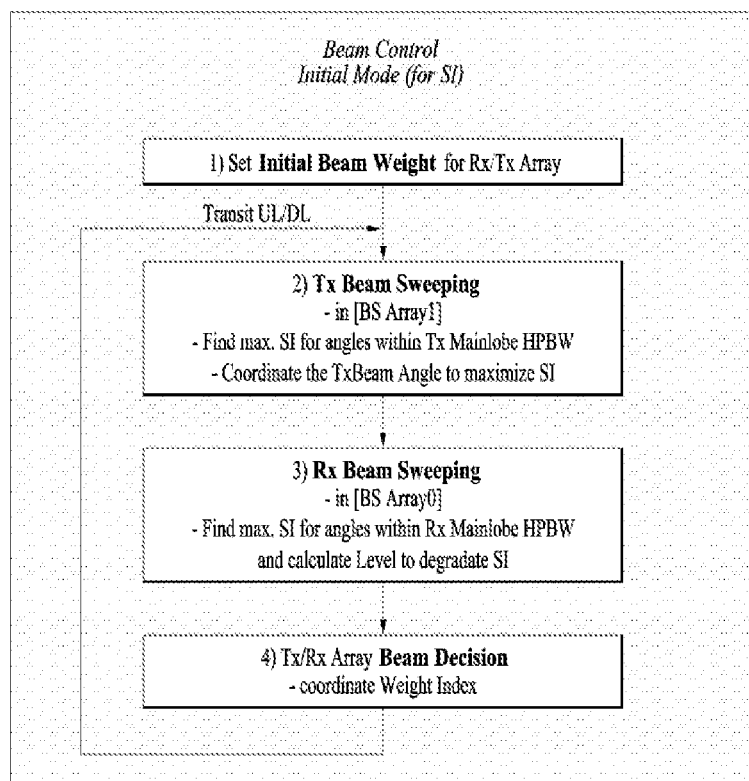
FIG. 23 is a diagram illustrating a method of reducing the influence of interference using beam direction and weight adjustment in an initial mode according to the present disclosure.

Method of Reducing Influence of Interference Using Beam Direction and Weight Adjustment in Initial Mode FIG. 23 is a diagram illustrating a method of reducing the influence of interference using beam direction and weight adjustment in an initial mode according to the present disclosure.

The initial mode is applied only to a device that operates in a full-duplex mode and corresponds to a procedure for adjusting a beam weight to offset SI affecting the receiver.

First, in Process 1), beam measurement is performed by applying an initial beam weight and a serving beam direction to a Tx/Rx array. To set an SI level to a desired level, a reference level needs to be set and this process is a prerequisite procedure. The initial beam weight may be freely set and a weight similar to an SLL level of a beam pattern having a uniform weight magnitude for each antenna may be basically applied.

Figure 24:
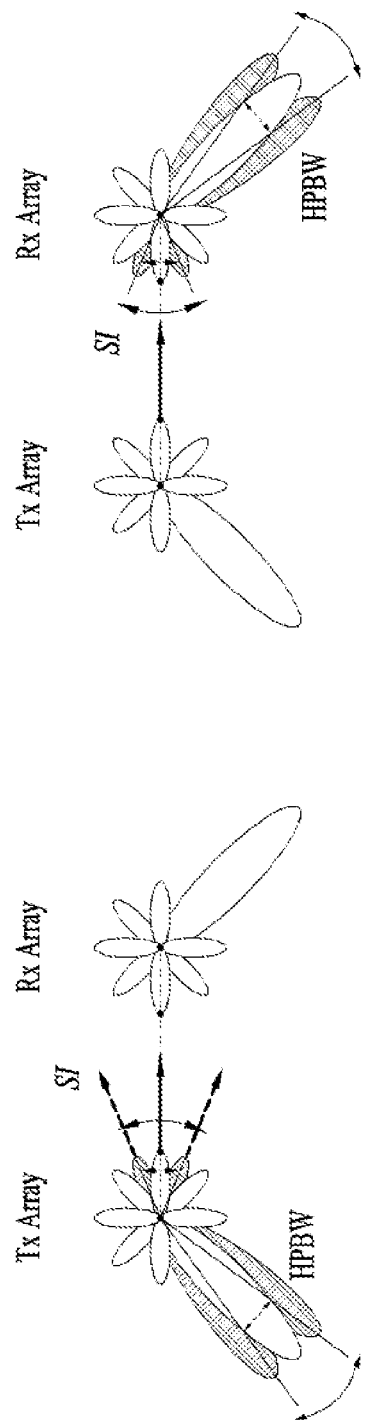
FIG. 24 is a diagram illustrating beam sweeping within a half-power beam width (HPBW) of a Tx array and an Rx array according to the present disclosure.

FIG. 24 is a diagram illustrating beam sweeping within a half-power beam width (HPBW) of a Tx array and an Rx array according to the present disclosure.

Processes 2) and 3) are processes for searching for a maximum value of the influence of SI through beam sweeping in the HPBW of a main lobe for each Tx or Rx array. For these processes, reference is made to FIG. 24.

In which direction SI received through a sidelobe is received with array gain of a certain degree is incapable of being confirmed only by one-time measurement. Since a sidelobe peak level is uniform and the beam width of the main lobe is wider than the beam width of the sidelobe by using a Dolph-Chebyshev weight, maximum SI affecting the receiver may be measured even if the beam sweeping operation is performed only in the HPBW of the main lobe. The HPBW of the main lobe may use a value corresponding to an initial weight index in the weight table. SI is maximized when sidelobes of the Tx/Rx array are aligned. If a sideload peak level is lowered to a level at which an MCS is maximally operated based on maximum SI, a situation in which SI is problematic in terms of performance does not occur even when a target beam direction is changed during operation. Therefore, if the beam sweeping operation is performed only once in the initial mode, the influence of SI is not problematic in absence of CLI in an MCS operation in the tracking mode. Here, a beam direction adjustment step size in the beam sweeping operation in the HPBW of the main lobe is related to performance and is adjustable according to the performance of the receiver.

Process 4) is a process for determining a weight index from the weight table based on a maximum SI measurement value. If the weight index is set to be high in order to lower the influence of SI, since the beam width of the main lobe is gradually widened, the SI level is lowered only to a noise level based on a signal-to-noise ratio (SNR) measurement value in consideration of a desired signal strength and a current channel situation. For example, when an initial beam weight index is 40, the maximum SI measurement value is received at a level weaker than a desired signal by 3 dB and, when an SNR is 20 dB, a weight index value for lowering SI by 17 dB may be set.

Figure 25:
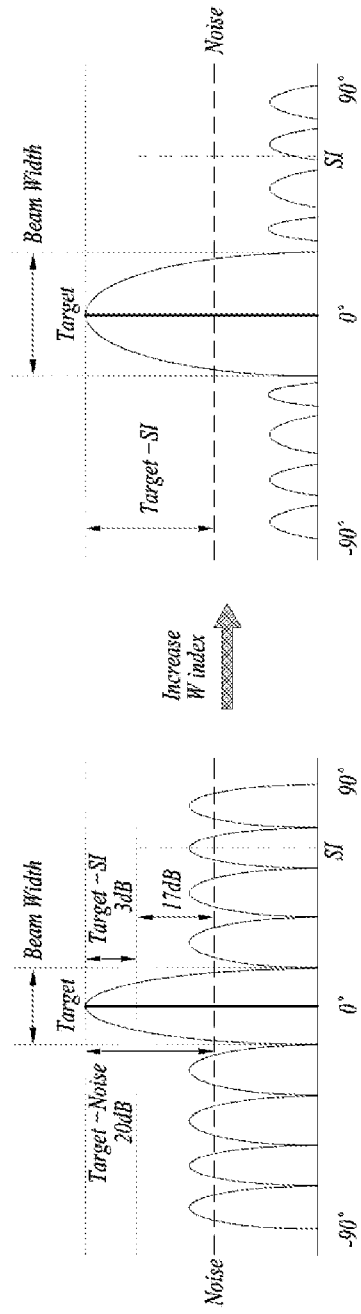
FIG. 25 is a diagram illustrating a beam pattern for reducing the influence of SI by lowering a sideload level (SLL) through adjustment of a Dolph-Chebyshev weight according to the present disclosure.

FIG. 25 is a diagram illustrating a beam pattern for reducing the influence of SI by lowering an SLL through adjustment of a Dolph-Chebyshev weight according to the present disclosure.

The initial mode aims to cancel interference by considering only the influence of SI. SI measured in an Rx array is received with strength obtained by adding beam gains of Tx and Rx arrays of a self-device. Therefore, in adjusting the Rx strength of SI, the Rx strength of SI may be changed by adjusting a weight index of the Tx array as well as a weight array of the Rx array. In the proposed method of the present disclosure, although the amount of weight index adjustment for SI has been considered to be adjusted in half with respect to each of the Tx array and the Rx array, an opportunity to adjust a corresponding part according to a situation of links connected to the Tx and Rx arrays may be provided in the tracking mode.

Figure 26:
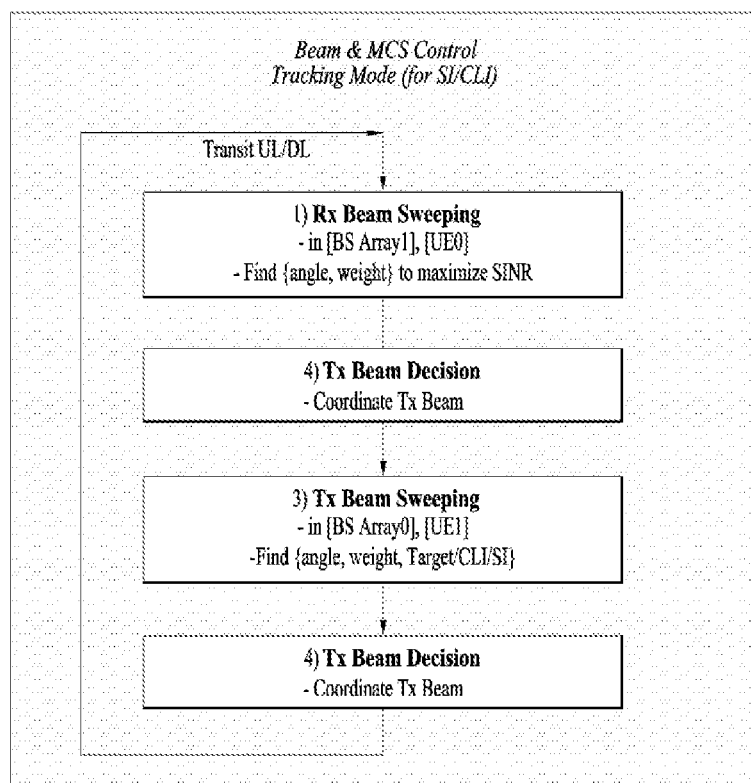
FIG. 26 is a diagram illustrating a method of reducing the influence of interference using beam direction and weight adjustment in a tracking mode according to the present disclosure.

Method of Reducing Influence of Interference Using Beam Direction and Weight Adjustment in Tracking Mode FIG. 26 is a diagram illustrating a method of reducing the influence of interference using beam direction and weight adjustment in a tracking mode according to the present disclosure.

The tracking mode is applicable in both a half-duplex mode and a full-duplex mode. In the half-duplex mode, the method of reducing the influence of interference corresponds to a procedure of adjusting a beam direction and a weight to offset interference from a neighboring communication device in consideration of CLI. In the full-duplex mode, the method of reducing the influence of interference corresponds to a procedure of adjusting a beam direction and a weight to offset interference from a neighboring communication device in consideration of both CLI and SI.

Figure 27:
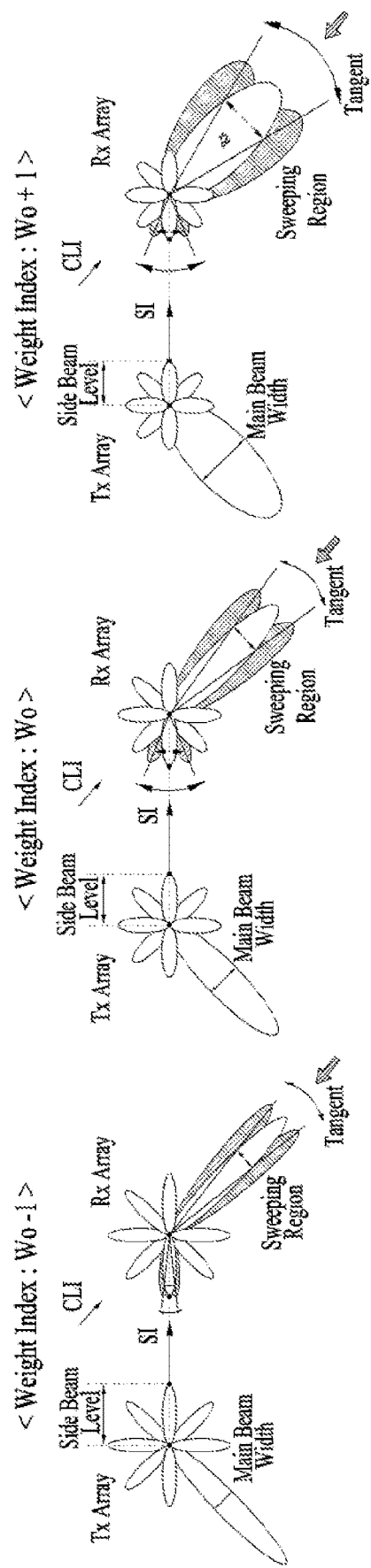
FIG. 27 is a diagram illustrating beam sweeping for adjusting a beam direction and a weight of an Rx array according to the present disclosure.

FIG. 27 is a diagram illustrating beam sweeping for adjusting a beam direction and a weight of an Rx array according to the present disclosure.

When performing the tracking mode for the first time, beam measurement is performed by setting a beam weight W0 and a beam direction A0 of each of Rx and Tx arrays using a weight index determined in the initial mode. Beam measurement is calculated with respect to each of strengths of a target signal and a CLI/SI signal.

First, Process 1) is a process for finding a maximum value of an SINR measurement value by adjusting a beam direction and a weight of an Rx array. For this process, reference is made to FIG. 27.

A beam direction and weight index search duration in a beam sweeping operation is basically determined and operated by the BS. An applied weight value uses a value predefined in the table according to a weight index and the beam sweeping operation is performed within a range close to a currently set beam direction and weight. The beam direction and weight index search duration may be differently set according to system performance and a channel situation. The search duration may be narrowed or widened according to an operation algorithm of the BS and may be flexibly adjusted according to a situation.

Process 2) is a process for determining the beam direction and weight measured in Process 1) for the Rx array. Process 3) corresponds to a beam sweeping process for the Tx array and serves to measure the strength of the influence of interference according to beam direction and weight adjustment for the Tx array in a situation in which the beam direction and weight found through the beam sweeping process for the Rx array is applied to the Rx array. In the beam sweeping operation, the beam direction and weight search duration should be set and operated by the BS in the same manner as Process 1).

Figure 28:
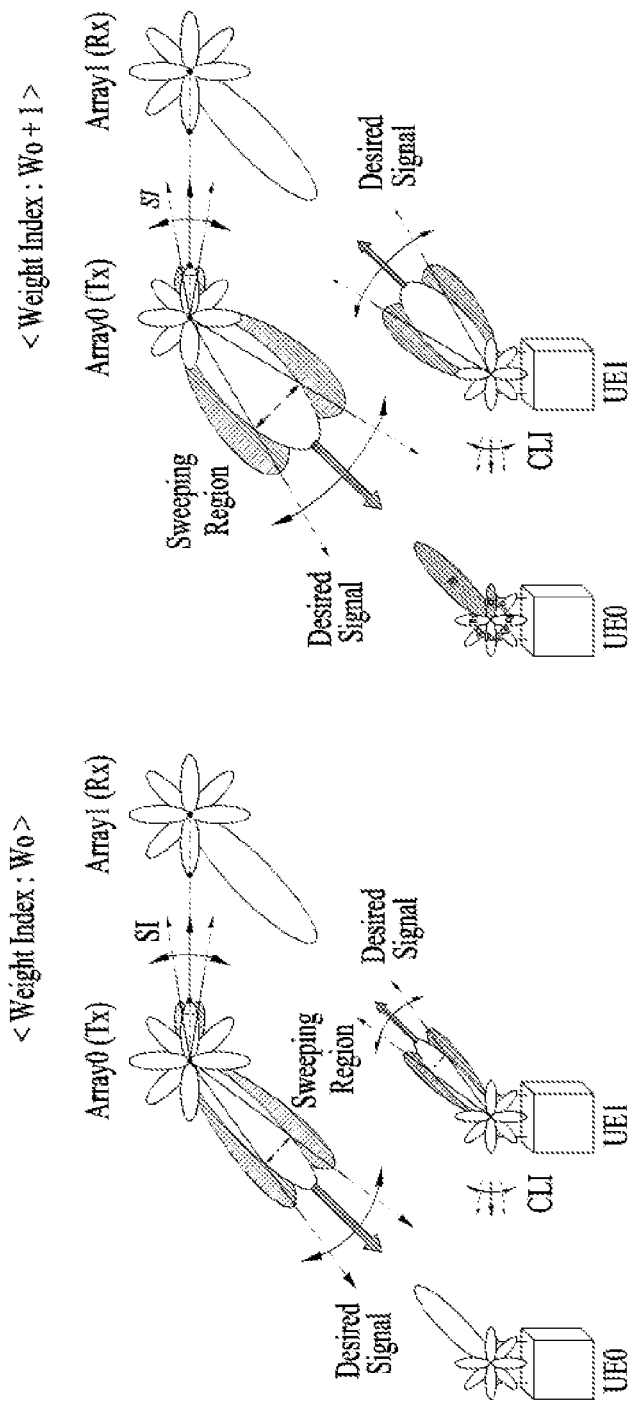
FIG. 28 is a diagram illustrating beam sweeping for adjusting a beam direction and a weight index of a Tx array according to the present disclosure.

FIG. 28 is a diagram illustrating beam sweeping for adjusting a beam direction and a weight index of a Tx array according to the present disclosure.

Process 4) is a process for determining a beam direction and a weight based on the measurement value for the Tx array in Process 3). Since the measurement operation for a Tx array beam in each link is performed by the Rx array of an Rx device, beam information should be transmitted to a Tx device so that the Tx device may use the measurement value. Therefore, the UE/BS needs to perform operation of transmitting information about the Tx beam upon switching between UL and DL. All Tx beam directions and weights are determined by the BS. A determination criterion of the Tx beam directions and weights may differ according to a scenario situation. The proposed method determines the Tx beam directions and weights as follows. For a Tx array of the BS performing an FDR operation, the ratio of the Rx strength of a DL signal to the Rx strength of SI is calculated to adjust a beam pattern using a beam direction and a weight corresponding to a maximum value of the ratio. For the UE on UL, the ratio of the Rx strength of a UL signal to the Rx strength of CLI which is an interference level affecting a neighboring UE is calculated to transmit a beam direction and a weight corresponding to a maximum value of the ratio to the UE on UL. This serves to maximally adjust overall link quality in consideration of both SI and CLI that affect a link.

When determining the beam pattern in Processes 2) and 4), there are two considerations in relation to weight index adjustment.

First, a weight adjustment method is considered when an SINR level at which maximum MCS is capable of being operated is measured. In a situation significantly affected by interference, a method of lowering the strength of sidelobes by raising a weight index is used. However, when the influence of CLI is removed or the beam pattern maximally offsets the influence of interference as a result of the beam tracking procedure, the SINR of a level at which maximum MCS is capable of being operated will be measured. In this case, the beam width of a main lobe may be widened due to the weight index increased by the influence of interference. If this state continues, there is a high probability that interference is received through the main lobe during reoccurrence of interference and interference greatly affects the main lobe. Accordingly, when the SINR of a level at which a maximum MCS is capable of being operated is measured, the proposed method limits operation so as to lower the weight index.

Second, an upper limit and a lower limit of the weight index should be set. Even in ultimate cases such as a situation of continuously increasing the weight index to offset the influence of interference during weight adjustment and a situation of continuously lowering the weight index because there is no influence of interference, the influence of interference may still be increased. A high weight index may increase a probability of receiving an interference signal through the main lobe and a low weight index may increase a probability of receiving the interference signal through the sidelobe due to an increased SLL. Accordingly, the upper limit and the lower limit of the weight index need to be set for an efficient operation method. A level similar to an SLL when the amplitude of the weight is uniform may be considered as the lower limit and a level of a noise figure may be considered as the upper limit. The upper limit and the lower limit may be differently set according to channel situation.

Figure 29:
FIG. 29 is a diagram illustrating an example of a procedure for a beam tracking operation of offsetting the influence of interference in an FDR environment according to the present disclosure.

FIG. 29 is a diagram illustrating an example of a procedure for a beam tracking operation of offsetting the influence of interference in an FDR environment according to the present disclosure.

Figure 30:
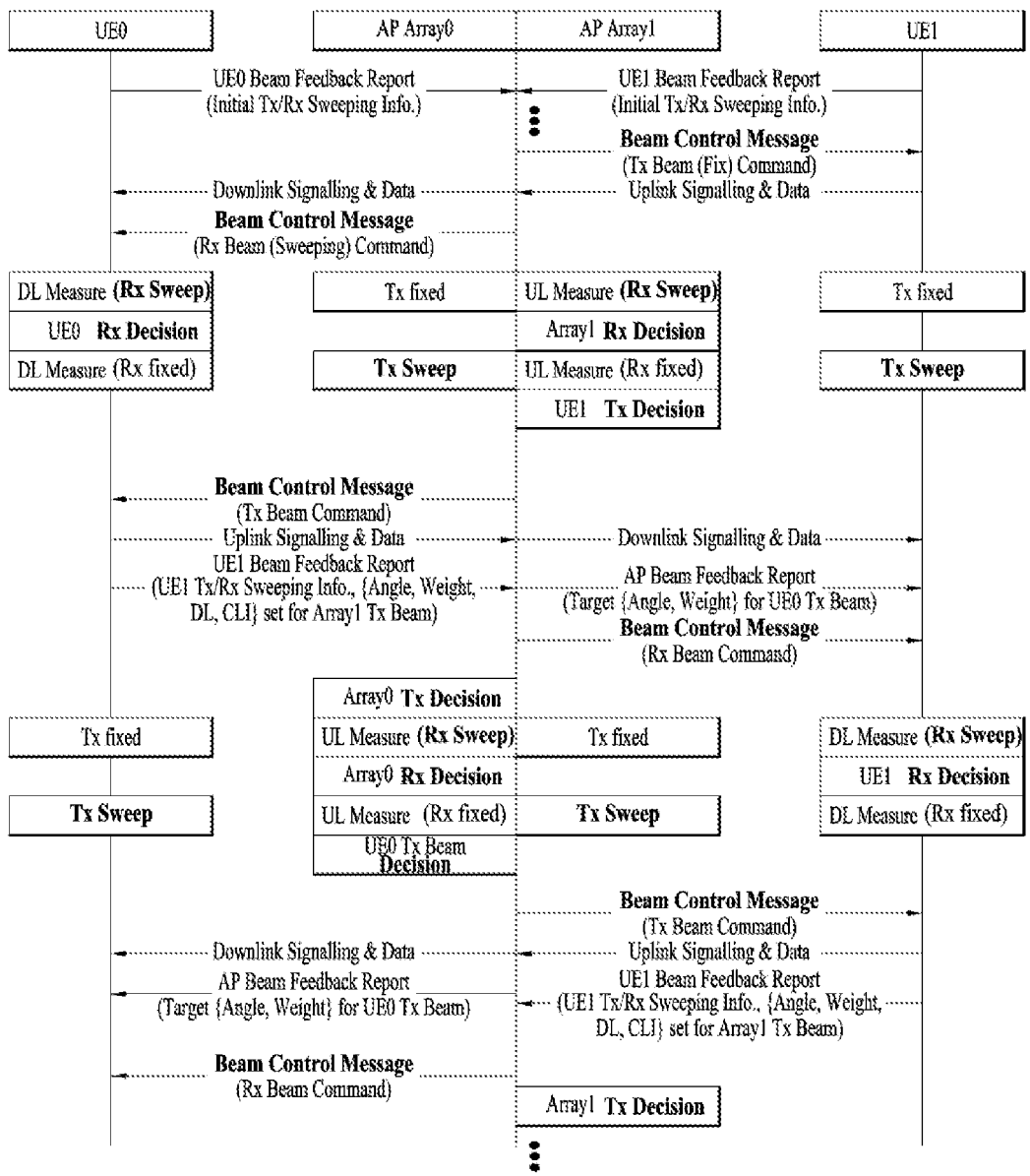
FIG. 30 is a diagram illustrating another example of a procedure for a beam tracking operation of offsetting the influence of interference in an FDR environment according to the present disclosure.

FIG. 30 is a diagram illustrating another example of a procedure for a beam tracking operation of offsetting the influence of interference in an FDR environment according to the present disclosure.

A beam tracking process requires an operation of measuring Rx beam information in an Rx array according to a Tx beam pattern of a Tx array. The UE may transmit or measure a beam by receiving a beam control message command from the BS. The difference between the procedure of FIG. 29 and the procedure of FIG. 30 lies in Tx and Rx beam control messages. In FIG. 29, the beam control messages are separately transmitted so as to operate a beam of the UE by distinguishing between a beam sweeping operation and a beam fixing operation. In FIG. 30, a command is transmitted so as to operate the beam of the UE by integrating both the beam sweeping operation and the beam fixing operation. Since the amount of Tx and Rx signaling information between the BS and the UE in FIG. 30 is further reduced as compared with the procedure of FIG. 29, a description will be given below based on the procedure of FIG. 30.

A basic premise is that a Tx array beam is adjusted after an Rx array beam is adjusted. Accordingly, beam information determined in an Rx array beam sweeping process is applied only when beam information is measured in a subsequent Tx array beam sweeping process. After the Tx array beam sweeping process is ended, Rx/Tx beam information is applied to data communication starting from the same timing.

All beam information measured in the Tx array beam sweeping process of the UE or the BS is collected by the BS and a final Tx beam pattern is determined and adjusted by the BS. Therefore, the BS may receive beam related information of the UE through a feedback report message and transmit the determined beam information to the UE.

When the BS transmits the beam control message command to the UE for the first time, the BS transmits the message command such that the beam tracking operation is performed based on beam sweeping information corresponding to a beam direction search duration in the initial mode. Next, in a UL situation, the BS periodically receives the beam sweeping information of the UE to perform the beam tracking operation by reflecting the information in the beam control message command.

The Rx/Tx beam control messages include resource allocation information for a measured signal. Table 7 and Table 8 below show examples of table information of the beam control messages.

TABLE 7

<Beam Control Message>

| | Field | Information |
|---|---|---|
| Rx Beam Command | Time Resource Allocation | Time Resource Allocation Pattern for Symbol/Slot/Frame Consider Sweeping information for BS TX Beam and UE Rx Beam [Candidate 1] Bit field for UE Rx Beam for pre-defined Symbols |
| | Freq. Resource Allocation | Frequency Resource Allocation Pattern for BS Tx Signal [Candidate 1] Start RE index. Sequence Mapping Step. Sequence Length. . . . |
| | . . . | . . . |
| Tx Beam Command | Time Resource Allocation | Time Resource Allocation Pattern for Symbol/Slot/Frame Consider Sweeping information for BS TX Beam and UE Tx Beam [Candidate 1] Bit field for UE Tx Beam for pre-defined Symbols |
| | Freq. Resource Allocation | Frequency Resource Allocation Pattern for EU Tx Signal [Candidate 1] Start RE index. Sequence Mapping Step. Sequence Length. . . . |
| | . . . | . . . |

TABLE 8

<Beam Control Message>

| | Field | Information |
|---|---|---|
| Rx Beam Command | Time Resource Allocation | Time Resource Allocation Pattern for Symbol/Slot/Frame Consider Sweeping Information BS Tx Beam and UE Rx Beam [Candidate 2] index of the Table defined cases of Time Resource Allocation |
| | Freq. Resource Allocation | Frequency Resource Allocation Pattern for BS Tx Signal [Candidate 2] index of the Table defined Sequences |
| Tx Beam Command | Time Resource Allocation | Time Resource Allocation Pattern for Symbol/Slot/Frame Consider Sweeping information for BS Rx Beam and UE Tx Beam [Candidate 2] index of the Table defined cases of Time Resources Allocation |
| | Freq. Resource Allocation | Frequency Resource Allocation Pattern for UE Tx Signal [Candidate 2] index of the Table defined Sequences |
| | . . . | . . . |

Basically, information about the beam control message corresponds to information related to beam sweeping to be performed by an array of the UE as signal information transmitted by the BS to the UE. In Table 7 and Table 8, field information in a message has the same meaning but has a difference in an expression method. In Table 7, a bit field of a symbol to which a time resource is allocated is represented as information, whereas, in Table 8, an index of a predefined information table to which the time resource is allocated is represented as information. A description of the field information in the message will be given below.

A Tx beam command message is information for performing a Tx beam sweeping operation of the UE in a UL situation between the BS and the UE. Accordingly, the UE periodically transmits Tx beam sweeping information to the BS as a report message and the BS fixes and receives an Rx beam suitable for a Tx beam sweeping duration of the UE with reference to the beam sweeping information in the report message of the UE. During a beam tracking operation, it should be considered that an Rx beam sweeping operation of the BS is first performed and then the Tx beam sweeping operation is performed based on a prerequisite condition that Rx beam sweeping is first performed.

In an Rx beam sweeping duration of the BS, a Tx beam direction and weight of the UE should be transmitted by being fixed as a value used for current data Tx and Rx and Tx beams should be transmitted as many times as the number of times of adjustment of an Rx beam direction within the sweeping duration. Accordingly, the BS should define Tx beam time resource allocation information of the UE in consideration of sweeping information of an Rx beam and transmit the same to the UE.

If the Rx beam sweeping operation of the UE is ended, the BS determines an Rx beam direction and weight based on a measurement value and then the UE performs the Tx beam sweeping operation. The UE transmits the Tx beam by allocating a sequence to time and frequency resources while adjusting a beam direction in a measurement unit in the Tx beam sweeping duration with reference to the Tx beam resource allocation information from the Tx beam command message. Beam information measured by the Rx array of the BS is then transmitted to the UE as a feedback report in a DL situation to adjust the Tx beam of the UE.

An Rx command message corresponds to a message for performing the Rx beam sweeping operation of the UE in a DL situation between the BS and the UE and is first performed prior to the Tx beam sweeping operation of the BS. The UE periodically transmits Rx beam sweeping information to the BS as the report message and the BS transmits a fixed Tx beam suitable for the Rx beam sweeping duration of the UE with reference to the beam sweeping information in the report message of the UE.

If the Rx beam sweeping operation of the UE is ended, the Rx beam direction and weight are determined and the Tx beam sweeping operation of the BS is performed. The BS transmits the Rx beam command message to the UE in consideration of the Tx beam sweeping information and the UE measures a beam of the BS by fixing Rx beams as many times as the number of transmissions within the Tx beam sweeping duration with reference to the Rx beam resource allocation information. The measured beam information is transmitted to the BS as a feedback report in a UL situation to adjust the Tx beam.

Table 9 and Table 10 below show examples of a feedback report message between the BS and the UE. Table 9 shows an AP beam feedback report message transmitted by the UE to the BS and Table 10 shows a UE beam feedback report message transmitted by the BS to the UE.

TABLE 9

| Field | Information |
| --- | --- |
| Tx Beam Coordination | Target (Angle, Weight) for UE Tx Beam |
| . . . | . . . |

TABLE 10

| Field | Information |
| --- | --- |
| Rx Serving Beam Info. | UE Rx Serving Beam Angle/Weight |
| Tx Serving Beam Info. | E Tx Serving Beam Angle/Weight |
| UE Rx Beam Sweeping Info. | UE Rx Sweeping Beam Width |
| | UE RX Sweeping Weight Range |
| EU TX Beam Sweeping Info. | UE Tx Sweeping Beam Width |
| | UE Tx Sweeping Weight Range |
| Rx Beam Measurement | A set of {DL, CLJ} Power Index for BS Tx Beam Sweeping (Angle, Weight) |
| . . . | . . . |

The UE beam feedback report message includes Tx/Rx serving beam information, which is beam information used for current data communication, and Tx/Rx beam sweeping information of the UE for the beam tracking operation. A beam sweeping duration is determined by the BS and a beam measurement operation is performed by transmitting the Tx/Rx beam command message to the UE. A beam direction and weight search range based on a serving beam is determined with reference to the beam sweeping information of the UE. The Rx beam measurement information corresponds to a measurement value within the Tx beam sweeping duration of the BS and corresponds to beam information transmitted by the UE to the BS. The AP beam feedback report includes the beam direction and weight determined by the BS in the Tx beam sweeping duration of the UE and the UE forms a beam so as to perform data communication in a UL situation.

A beam measurement value that is fed back may be transmitted using a method of transmitting a table index value corresponding to a signal strength value. Table 11 and Table 12 below show examples of tables used to represent beam measurement values.

TABLE 11

| Power Index | Range of the Measured value [dBm] |
| --- | --- |
| . . . | . . . |
| RSRP_−1 | −1 ≤ RSRP < 0 |
| RSRP_0 | 0 ≤ RSRP < 1 |
| RSSI_1 | 1 ≤ RSRP < 2 |
| . . . | . . . |
| RSRP_30 | 30 ≤ RSRP < 31 |
| RSRP_31 | 31 ≤ RSRP < 32 |
| . . . | . . . |

TABLE 12

| Power Index | Range of the Measured value [dBm] |
|---|---|
| ... | ... |
| RSSI_-1 | −1 ≤ RSRP < 0 |
| RSSI_0 | 0 ≤ RSRP < 1 |
| RSSI_1 | 1 ≤ RSRP < 2 |
| ... | ... |
| RSSI_30 | 30 ≤ RSRP < 31 |
| RSSI_31 | 31 ≤ RSRP < 32 |
| ... | ... |

The receiver may measure strengths of a desired signal and CLI/SI from a Tx beam and the measured value is transmitted through the feedback report message in a UL situation. The measured value may be variously defined according to the meaning thereof. The examples disclosed in Table 11 and Table 12 are obtained by defining table information for a measured value of a reference signal received power (RSRP) and a received signal strength indicator (RSSI), respectively, and are defined to classify indexes according to the range of measured values. A measured result value in the feedback report message may be considered to include and transmit a power index.

Next, a description of a dedicated RS for measuring a desired signal and the influence of interference will be given. As an operation method of the dedicated RS, two methods are considered. The first method serves to allocate and operate resources by a new scheme using an existing RS of 5G NR standards and the second method serves to generate and allocate a new RS suitable for SI measurement usage.

The first method is advantageous in that there is no need to additionally generate a dedicated RS sequence because an existing RS is used. In the 5G NR standards, there are RSs such as a CSI-RS used to measure channel status information (CSI) and a DMRS used for channel estimation for data decoding. These RSs may be applied to the beam tracking operation proposed in the present disclosure.

The second method serves to additionally generate a new dedicated RS and may be operated by optimizing resource allocation information and a signaling process related to the beam tracking operation. Thus, a shorter measurement period may be used relative to the case in which the existing RS is used, or an opportunity to flexibly use an additional scenario that may occur only in the full-duplex mode may be provided.

Figure 31A:

FIGS. 31a and 31b are diagrams illustrating an example of time resource allocation of an RS for Tx and Rx beam information measurement according to the present disclosure.

Figure 32A:
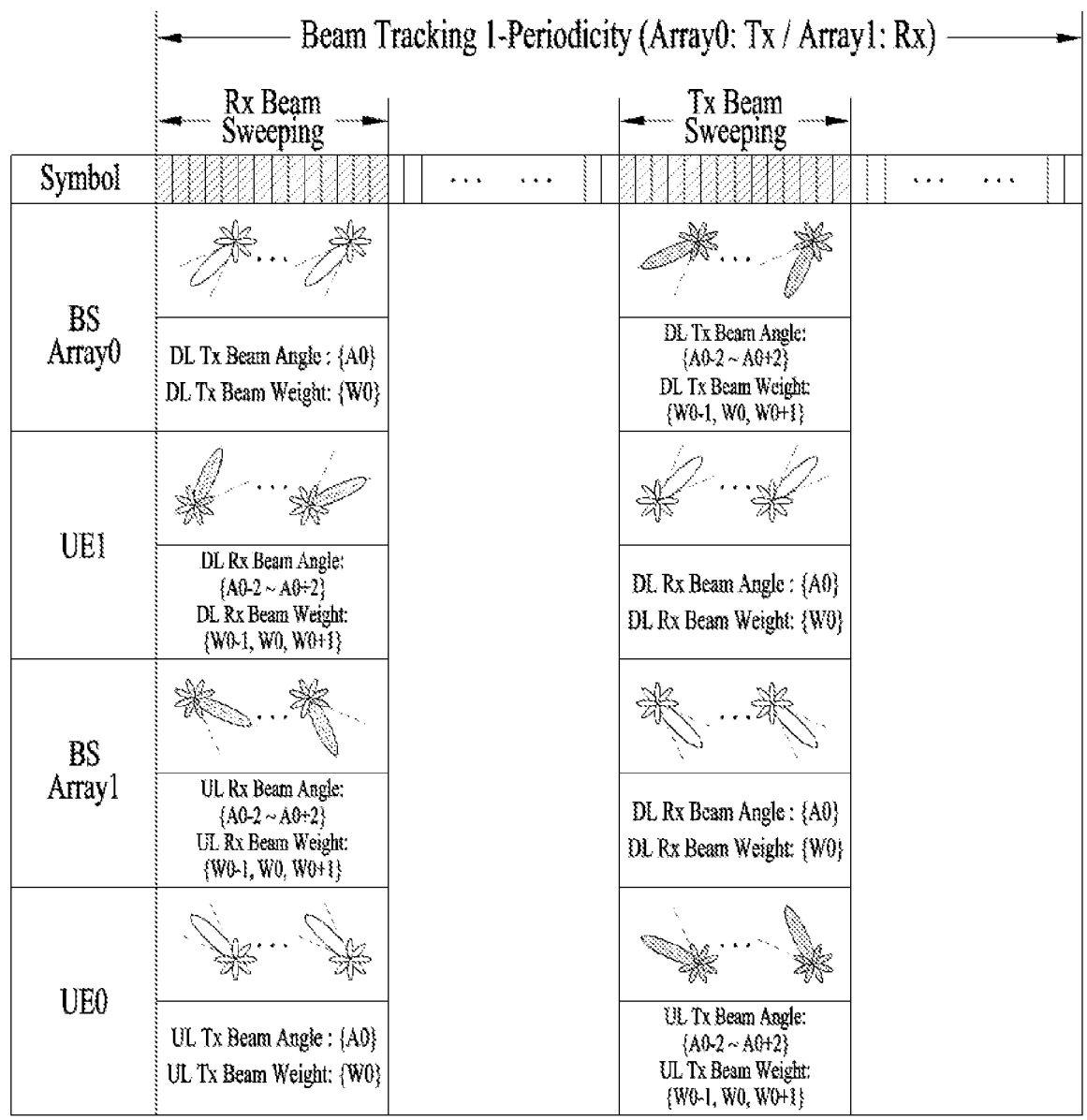
FIGS. 32a and 32b are diagrams illustrating another example of time resource allocation of an RS for Tx and Rx beam information measurement according to the present disclosure.
Figure 32B:

FIGS. 32a and 32b are diagrams illustrating another example of time resource allocation of an RS for Tx and Rx beam information measurement according to the present disclosure.

In FIGS. 31a, 31b, 32a and 32b, it may be appreciated that an Rx/Tx beam sweeping operation is performed in one period for each array of the BS in order to measure interference according to a beam direction and a weight. It may be appreciated that RS Tx and Rx operations of each array are performed by dividing a time duration on a symbol basis and RSs may be continuously allocated or may be allocated between different signals according to a channel situation. In addition, an RS symbol is periodically allocated in a time region so as to persistently perform beam tracking. Therefore, a time resource allocation method may be flexibly performed by differently allocating time resources according to a channel situation.

Figure 33A:
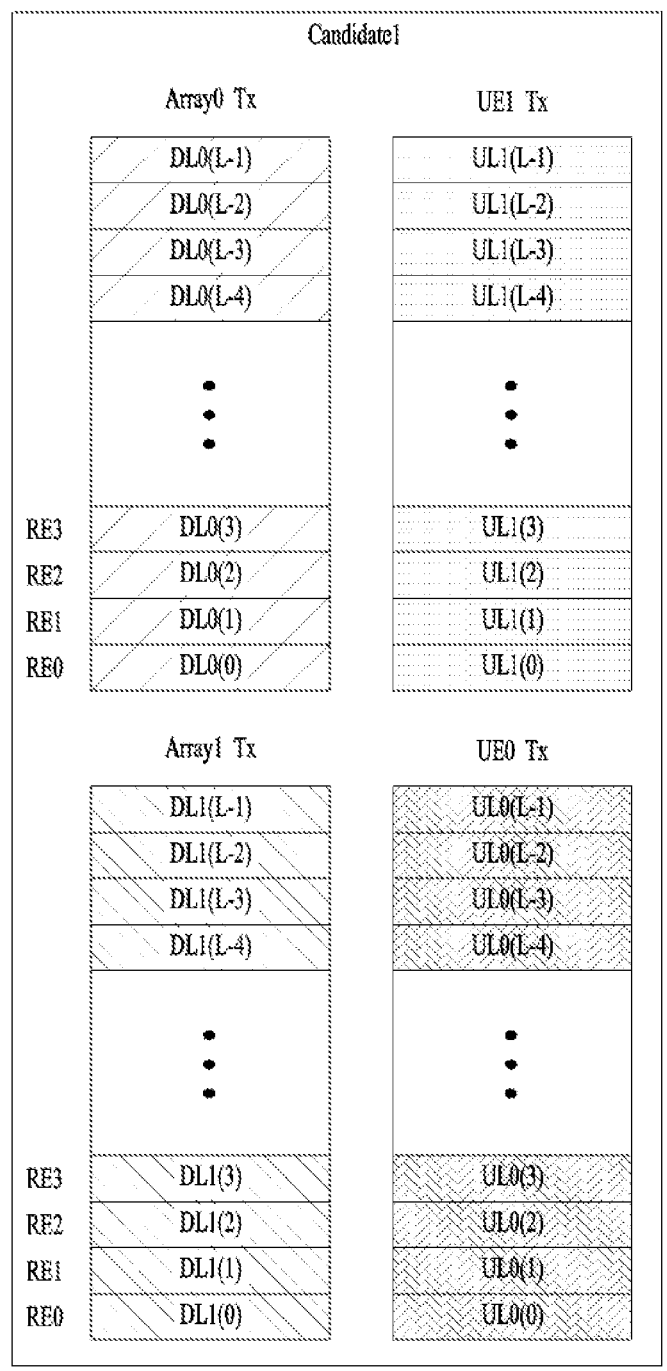
FIGS. 33a, 33b and 33c are diagrams illustrating an example of frequency resource allocation of an RS for Tx and Rx beam information measurement according to the present disclosure.
Figure 33B:
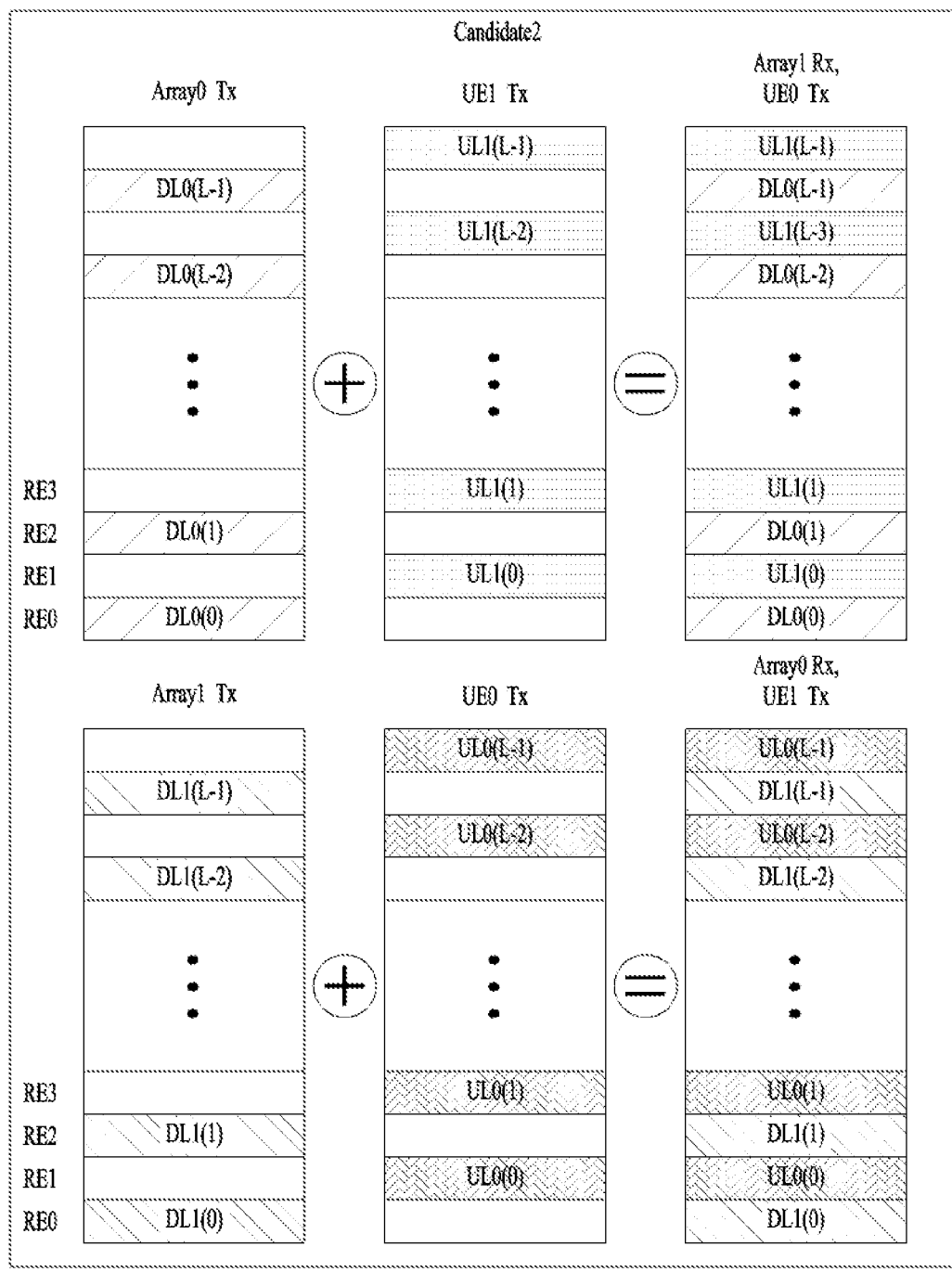
Figure 33C:
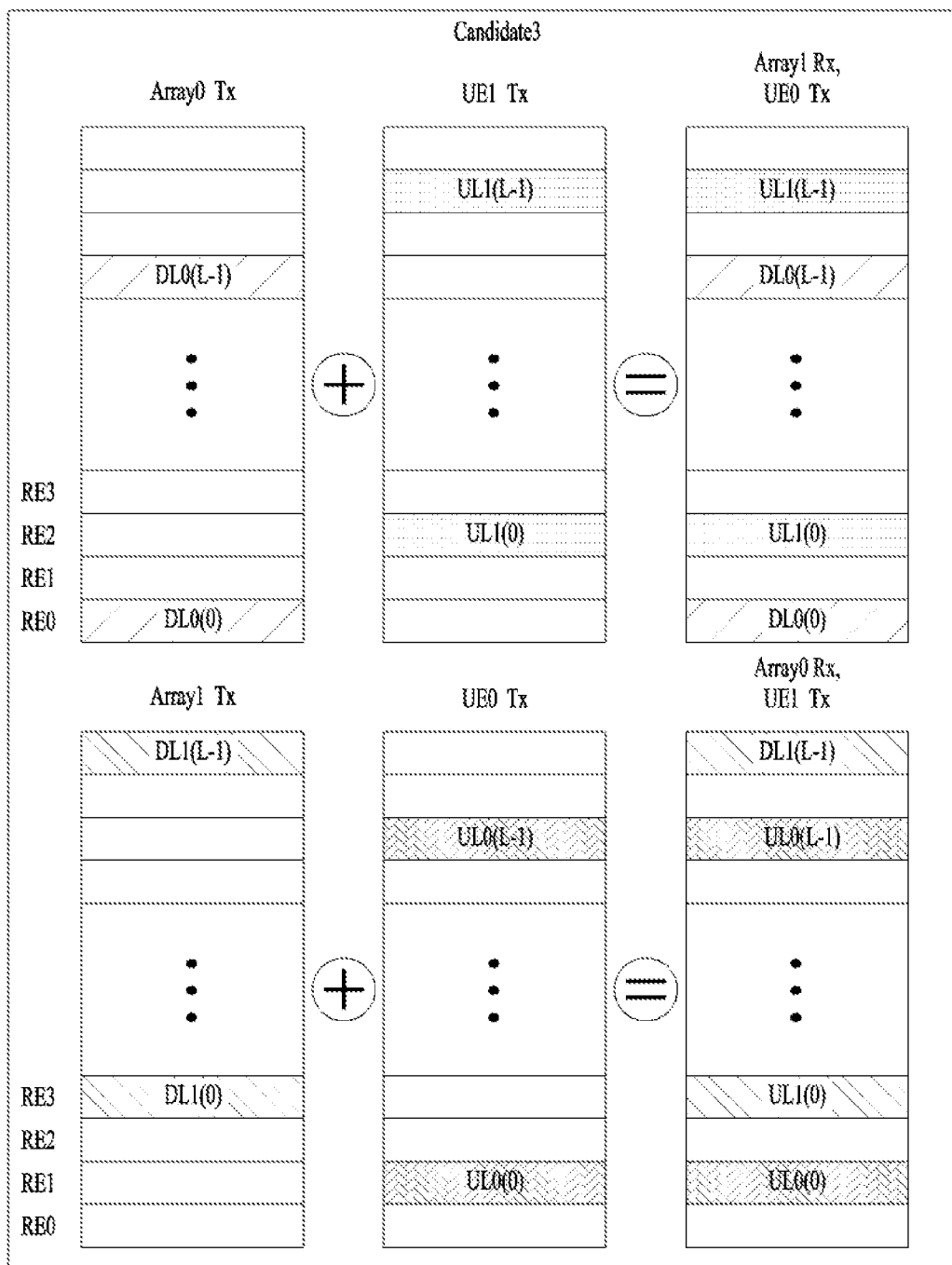

FIGS. 33a, 33b and 33c are diagrams illustrating an example of frequency resource allocation of an RS for Tx and Rx beam information measurement according to the present disclosure.

In FISG. 33a, 33b and 33c, if a frequency resource is allocated such that RS signals between links are orthogonal by applying a frequency resource allocation scheme of a comb type as shown by Candidates 2 and 3, it is easy to measure the strength of a desired signal and the strength of SI/CLI corresponding to interference between links without affecting the desired signal and SI/CLI. Accordingly, the receiver that measures beams may measure strengths of signals by receiving frequency allocation information.

When a frequency resource allocation scheme such as Candidate 1 of FIGS. 33a, 33b and 33c are applied, if RS sequences used as the desired signal and the SI/CLI signal are well designed to be used without correlation, the receiver may obtain the strength of each signal using a correlator.

Figure 34:
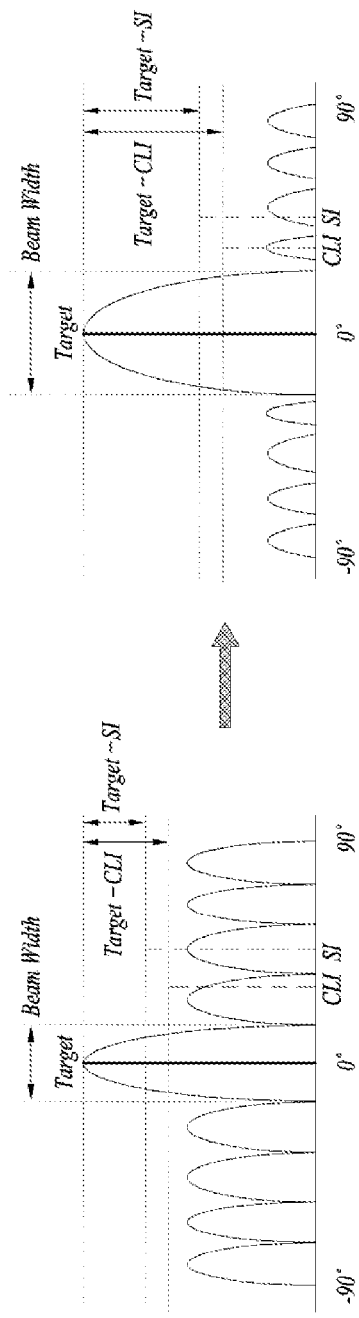
FIGS. 34 and 35 are diagrams illustrating examples of beam patterns determined by a beam tracking operation in Tx and Rx arrays according to the present disclosure.
Figure 35:
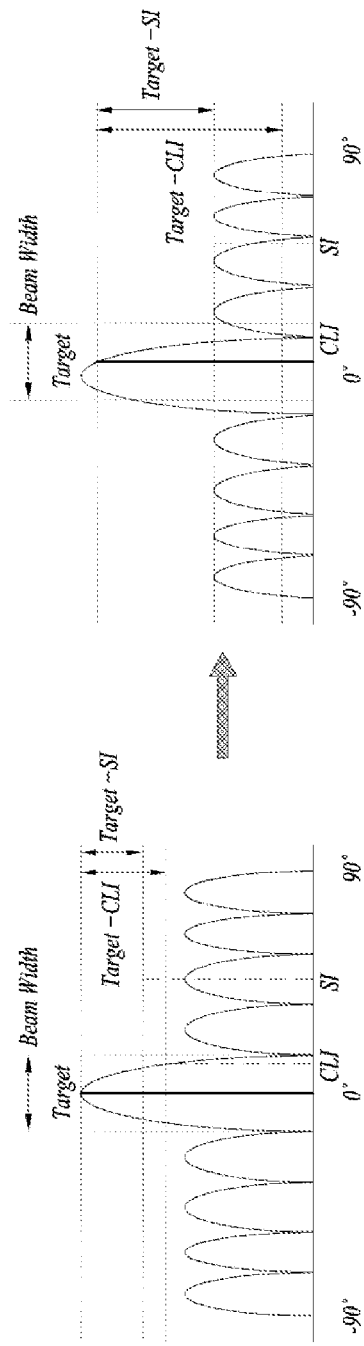

FIGS. 34 and 35 are diagrams illustrating examples of beam patterns determined by a beam tracking operation in Tx and Rx arrays according to the present disclosure.

A target signal level is a signal level corresponding to a link between the BS and the UE and a beam pattern is formed to lower a CLI/SI signal level to a lower level through the beam tracking operation based on the target signal level. Thereby, link quality between the BS and the UE in an FDR environment is expected to be improved.

The present disclosure supports the following:
1) a Dolph-Chebyshev beam weight table specified to be used according to an MLL-SLL value;
2) the procedure of reducing the influence of interference using the Dolph-Chebyshev beam weight table; and
3) a method of generating a dedicated RS and allocating resources and an operation mechanism through signaling.

Hereinbelow, devices for performing the above-described proposed methods will be described in detail.

Examples of Communication System to which Present Disclosure is Applied

The description, functions, procedures, proposals, methods, and/or operational flowcharts disclosed in the present disclosure may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 36:
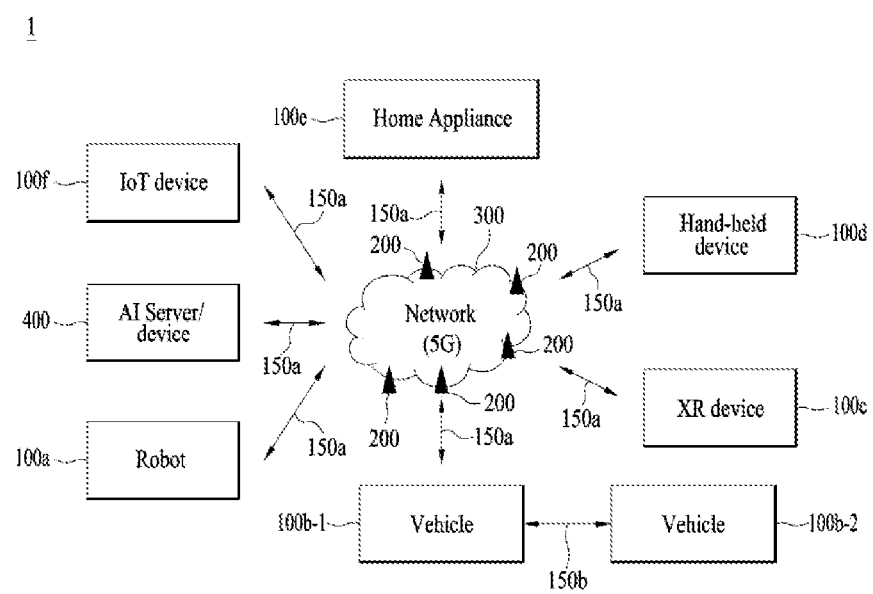
FIG. 36 illustrates a communication system applied to the present disclosure.

FIG. 36 illustrates a communication system applied to the present disclosure.

Referring to FIG. 36, a communication system 1 applied to the present disclosure includes wireless devices, BSs, and a network. Here, the wireless devices represent devices performing communication using RAT (e.g., 5G NR) or LTE) and may be referred to as communication/radio/5G devices. The wireless devices may include, without being limited to, a robot 100a, vehicles 100b-1 and 100b-2, an extended reality (XR) device 100c, a handheld device 100d, a home appliance 100e, an Internet of things (IoT) device 100f, and an artificial intelligence (AI) device/server 400. For example, the vehicles may include a vehicle having a wireless communication function, a self-driving vehicle, and a vehicle capable of performing vehicle-to-vehicle communication. The vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, digital signage, a vehicle, a robot, etc. The handheld device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). In addition, the IoT device 100f (e.g., a sensor) may perform direct communication with other IoT devices (e.g., sensors) or other wireless devices 100a to 100f.

Wireless communication/connections 150a, 150b, and 150c may be established between the wireless devices 100a to 100f and the BSs 200, between wireless devices 100a to 100f, and between the BSs 200, respectively. Here, the wireless communication/connections may be established using various RATs (e.g., 5G NR) such as UL/DL communication 150a, sidelink communication 150b (or D2D communication), and communication 15c between the BSs (e.g., a relay or integrated access backhaul (IAB)). The wireless devices and the BSs, the wireless device and the wireless device, and the BS and the BS may transmit/receive radio signals to/from each other through the wireless communication/connections 150a, 150b, and 150c. For example, the wireless communication/connections 150a, 150b, and 150c may transmit/receive signals through various physical channels. To this end, at least a part of various configuration information configuring processes, various signal processing processes (e.g., channel encoding/decoding, modulation/demodulation, and resource mapping/demapping), and various resource allocation processes, for transmitting/receiving radio signals, may be performed based on the various proposals of the present disclosure.

Examples of Wireless Devices to which the Present Disclosure is Applied

Figure 37:
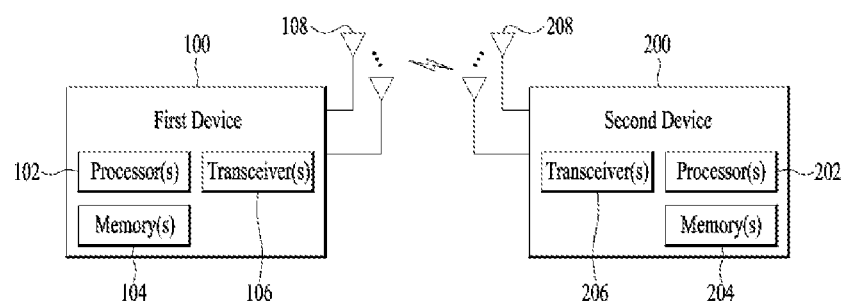
FIG. 37 illustrates wireless devices applicable to the present disclosure.

FIG. 37 illustrates wireless devices applicable to the present disclosure.

Referring to 37, a first wireless device 100 and a second wireless device 200 may transmit and receive signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 36.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the description, functions, procedures, proposals, methods, and/or operational flowcharts disclosed in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or the entirety of processes controlled by the processor(s) 102 or store software code including instructions for performing the description, functions, procedures, proposals, methods, and/or operational flowcharts disclosed in the present disclosure. Here, the processor(s) 102 and the memory(s) 104 may be a part of a communication modem/circuit/chipset designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with RF unit(s). In the present disclosure, the wireless device may represent the communication modem/circuit/chipset.

Specifically, the chipset may include the processor(s) 102 and the memory(s) 104. The memory(s) 104 may include at least one program capable of performing an operation related to the above-described embodiments. The processor(s) 102 may receive FDR-related resources that are allocated based on the at least one program stored in the memory(s) 104.

The processor(s) 102 may control the transceivers(s) 106 to report self-IC capability to the BS. The processor(s) 102 may control the transceivers(s) 106 to receive resource allocation information about a preconfigured time duration divided into a first time resource duration and a second time resource duration from the BS. The first time resource duration may be a time resource duration allocated to simultaneously perform transmission of a UL signal and reception of a DL signal in the same frequency band, and the second time resource duration may be a time resource duration allocated for transmission of the UL signal or reception of the DL signal. The first time resource duration and the second time resource duration may be determined based on the self-IC capability, the amount of first data related to the UL signal, and the amount of second data related to the DL signal.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the description, functions, procedures, proposals, methods, and/or operational flowcharts disclosed in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or the entirety of processes controlled by the processor(s) 202 or store software code including instructions for performing the description, functions, procedures, proposals, methods, and/or operation flowcharts disclosed in the present disclosure. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent the communication modem/circuit/chipset.

The processor(s) 202 related to the BS may control the transceivers(s) 206 to receive a report on self-IC capability related to FDR from the UE. The processor(s) 202 may determine a first time resource duration during which transmission and reception of UL and DL signals are simultaneously performed and a second time resource duration during which transmission of the UL signal or reception of the DL signal is performed. The processor(s) 202 may control the transceiver(s) 206 to transmit resource allocation information including information about the first time resource duration and the second time resource duration to the UE.

As another aspect of the present disclosure, a computer readable storage medium including at least one computer program for causing, when executed, the at least one processor to perform an operation is provided. The operation may include providing information related to self-IC capability to the BS and receiving resource allocation information about a preconfigured time duration divided into a first time resource duration and a second time resource duration from the BS. The first time resource duration may be a time resource duration allocated to simultaneously perform transmission of a UL signal and reception of a DL signal in the same frequency band, and the second time resource duration may be a time resource duration allocated for transmission of the UL signal or reception of the DL signal. The first time resource duration and the second time resource duration may be determined based on the self-IC capability, the amount of first data related to the UL signal, and the amount of second data related to the DL signal.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the description, functions, procedures, proposals, methods, and/or operational flowcharts disclosed in the present disclosure. The one or more processors 102 and 202 may generate messages, control information, data, or information according to the description, functions, procedures, proposals, methods, and/or operational flowcharts disclosed in the present disclosure. The one or more processors 102 and 202 may generate signals (e.g., baseband signals) including PDUs, SDUs, messages, control information, data, or information according to the description, functions, procedures, proposals, methods, and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the description, functions, procedures, proposals, methods, and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The description, functions, procedures, proposals, methods, and/or operational flowcharts disclosed in the present disclosure may be implemented using firmware or software, and the firmware or software may be configured to include the modules, procedures, or functions. Firmware or software configured to perform the description, functions, procedures, proposals, methods, and/or operational flowcharts disclosed in the present disclosure may be included in the one or more processors 102 and 202 or stored in the one or more memories 104 and 204 so as to be driven by the one or more processors 102 and 202. The description, functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured as read-only memories (ROMs), random access memories (RAMs), electrically erasable programmable read-only memories (EPROMs), flash memories, hard drives, registers, cache memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the description, functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the description, functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Use Cases of Wireless Devices to which Present Disclosure is Applied

Figure 38:
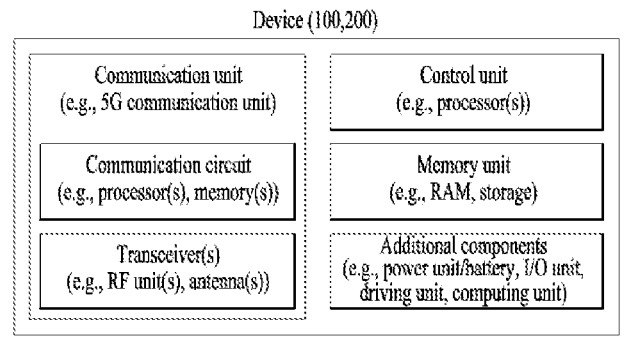
FIG. 38 illustrates another example of a wireless device applied to the present disclosure.

FIG. 38 illustrates another example of a wireless device applied to the present disclosure. The wireless device may be implemented in various forms according to use cases/services.

Referring to FIG. 38, wireless devices 100 and 200 may correspond to the wireless devices 100 and 200 of FIG. 37 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 37. For example, the transceiver(s) 114 may include the one or more transceivers 106 and 206 and/or the one or more antennas 108 and 208 of FIG. 37. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, an input/output (I/O) unit, a driving unit, and a computing unit. The wireless device may be implemented in the form of, without being limited to, the robot (100a of FIG. W1), the vehicles (100b-1 and 100b-2 of FIG. 36), the XR device (100c of FIG. 36), the handheld device (100d of FIG. 36), the home appliance (100e of FIG. 36), the IoT device (100f of FIG. 36), a digital broadcast terminal, a holographic device, a public safety device, an MTC device, a medicine device, a fintech device (or a finance device), a security device, a climate/environment device, the AI server/device (400 of FIG. 36), the BSs (200 of FIG. 36), a network node, etc. The wireless device may be used in a mobile or fixed place according to a use case/service.

In FIG. 38, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphics processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Hereinafter, an implementation example of FIG. 38 will be described in detail with reference to the drawings.

Example of Handheld Device to which Present Disclosure is Applied

Figure 39:
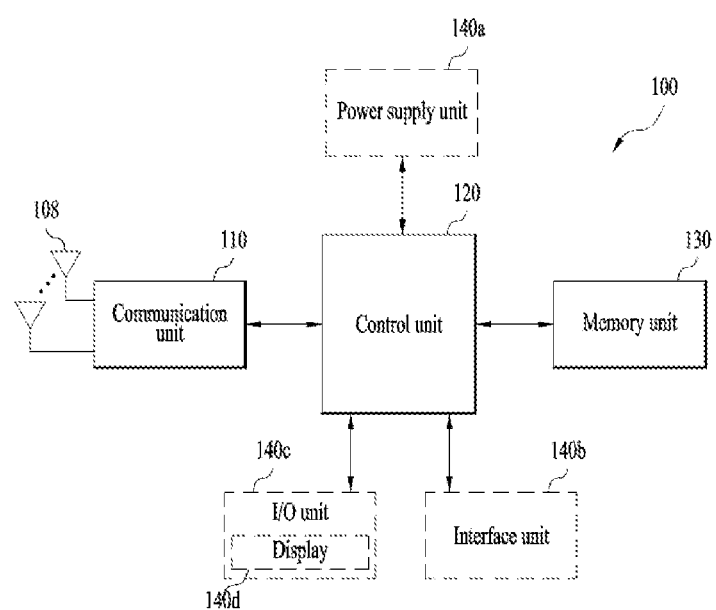
FIG. 39 illustrates a handheld device applied to the present disclosure.

FIG. 39 illustrates a handheld device applied to the present disclosure. The handheld device may include a smartphone, a smartpad, a wearable device (e.g., a smartwatch or smartglasses), or a portable computer (e.g., a notebook). The handheld device may be referred to as an MS, a UT, an MSS, an SS, an AMS, or a WT.

Referring to FIG. 39, a handheld device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 38, respectively.

The communication unit 110 may transmit and receive signals (e.g., data and control signals) to and from other wireless devices or BSs. The control unit 120 may perform various operations by controlling constituent elements of the handheld device 100. The control unit 120 may include an application processor (AP). The memory unit 130 may store data/parameters/programs/code/commands needed to drive the handheld device 100. The memory unit 130 may store input/output data/information. The power supply unit 140a may supply power to the handheld device 100 and include a wired/wireless charging circuit, a battery, etc. The interface unit 140b may support connection of the handheld device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may covert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 40:
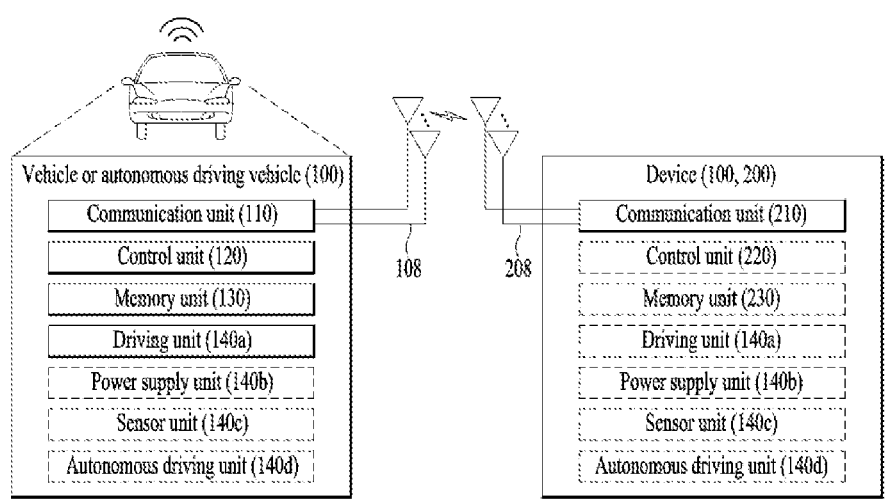
FIG. 40 illustrates a vehicle or an autonomous driving vehicle applied to the present disclosure.

Example of Vehicle or Self-Driving Vehicle to which Present Disclosure is Applied FIG. 40 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 40, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110, 130, and 140a to 140d correspond to the blocks 110, 130, and 140 of FIG. 38, respectively.

The communication unit 110 may transmit and receive signals (e.g., data and control signals) to and from external devices such as other vehicles, BSs (e.g., RSUs), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane in which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

In the present disclosure, the embodiments of the present disclosure have been described mainly focusing on a signal transmission and reception relationship between a UE and a BS. Such as signal transmission and reception relationship may be equally or similarly extended even to signal transmission and reception between the UE and a relay or between the BS and the relay. In the present disclosure, a specific operation described as being performed by the BS may also be performed by an upper node of the BS. That is, it is apparent that, in a network consisting of a plurality of network nodes including the BS, various operations performed for communication with the UE may be performed by the BS, or network nodes other than the BS.

The embodiments of the present disclosure may be implemented by various means, for example, hardware, firmware, software, or a combination thereof. In a hardware configuration, the methods according to exemplary embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present disclosure may be implemented in the form of a module, a procedure, a function, etc. that perform the above-described functions or operations. Software code may be stored in a memory unit and be executed by a processor.

The memory unit may be located at the interior or exterior of the processor and may transmit and receive data to and from the processor via various known means.

The present disclosure applies BF technology in an FDR communication system and may reduce the influence of SI and CLI without implementing an additional circuit at an Rx end.

It will be appreciated by persons skilled in the art that that the effects that are achievable through various embodiments are not limited to what has been particularly described hereinabove and other advantages not mentioned herein will be more clearly understood from the above detailed description.

The implementation examples of the present disclosure described above may be applied to various mobile communication systems.

Those skilled in the art will appreciate that the present disclosure may be embodied in other specific forms than those set forth herein without departing from the spirit and essential characteristics of the present disclosure. The above description is therefore to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

What is claimed is:

1. A method of transmitting and receiving signals by a transmission device in a wireless communication system, the method comprising:
   receiving configuration information related to a downlink reference signal (DL-RS);
   receiving the DL-RS based on a received beam in a first array;
   measuring a maximum value of an interference signal, among values of interference signals for beam directions and weights, based on the DL-RS;
   determining a first beam direction of the beam directions and a first weight of the weights based on the maximum value of the interference signal;
   transmitting an uplink demodulation reference signal (UL-DMRS) based on a transmitted beam in a second array;
   measuring a maximum ratio among ratios of a received strength of the DL-RS to a received strength of a self-interference (SI) signal for the beam directions and the weights based on the transmitted signal; and
   determining a second beam direction of the beam directions and a second weight of the weights based on the maximum ratio,
   wherein the interference signal is measured within a predetermined weight range,
   wherein the UL-DMRS is included in a physical uplink shared channel (PUSCH),
   wherein, based on the UL-DMRS being enabled precoding, the UL-DMRS is generated based on pseudo-noise (PN) sequence,
   wherein, based on the UL-DMRS being not enabled precoding, the UL-DMRS is generated based on Zad-off-Chu (ZC) sequence having a length equal to or larger than 30,
   wherein the DL-RS is a channel state information (CSI)-RS or a DL-DMRS;
   wherein a position of the DL-DMRS is determined based on a mapping type of a physical downlink shared channel (PDSCH), and
   wherein the PDSCH includes the DL-DMRS,
   wherein the DL-RS are received in a radio frame including a plurality of slots,
   wherein a number of a plurality of slots included in the frame is determined based on a Subcarrier Spacing (SCS) of the DL-RS, and
   wherein each of the plurality of slots includes 14 Orthogonal Frequency Division Multiplexing (OFDM) symbols.

2. The method of claim 1,
   wherein the predetermined weight range is generated in a form of table information,
   wherein the table information includes at least one of a weight index, a difference value between a main lobe peak level and a sidelobe peak level, a half-power beam width (HPBW), or a weight coefficient to be applied to each antenna element, and
   wherein the difference value between the main lobe peak level and the sidelobe peak level is mapped to the weight index in one-to-one correspondence.

3. The method of claim 1,
   further comprising setting an initial beam weight and an initial beam direction,
   wherein the maximum value of the interference signal is measured based on the initial beam weight and the initial beam direction.

4. The method of claim 1,
   further comprising receiving a beam command message from a base station,
   wherein the beam command message includes resource allocation information about the transmitted beam and the received beam.

5. A transmission device of a wireless communication system, the transmission device comprising:
   a transmitter;
   a receiver; and
   a controller;
   wherein the controller is configured to:
      control the receiver to:
         receive configuration information related to a downlink reference signal (DL-RS),
         receive the DL-RS based on a received beam in a first array,
      measure a maximum value of an interference signal among values of interference signals for beam directions and weights based on the DL-RS,
      determine a first beam direction of the beam directions and a first weight of the weights based on the maximum value of the interference signal,
      control the transmitter to transmit an uplink demodulation reference signal (UL-DMRS) based on a transmitted beam in a second array,
      measure a maximum ratio among ratios of a received strength of the DL-RS to a received strength of a self-interference (SI) signal for the beam directions and the weights based on the transmitted signal, and
      determine a second beam direction of the beam directions and a second weight of the weights based on the maximum ratio, and
   wherein the interference signal is measured within a predetermined weight range,
   wherein the UL-DMRS is included in a physical uplink shared channel (PUSCH), wherein, based on the UL-DMRS being enabled precoding, the UL-DMRS is generated based on pseudo-noise (PN) sequence, wherein, based on the UL-DMRS being not enabled precoding, the UL-DMRS is generated based on Zadoff-Chu (ZC) sequence having a length equal to or larger than 30, wherein the DL-RS is a channel state information (CSI)-RS or a DL-DMRS, wherein a position of the DL-DMRS is determined based on a mapping type of a physical downlink shared channel (PDSCH), wherein the PDSCH includes the DL-DMRS, wherein the DL-RS are received in a radio frame including a plurality of slots, wherein a number of a plurality of slots included in the frame is determined based on a Subcarrier Spacing (SCS) of the DL-RS, and wherein each of the plurality of slots includes 14 Orthogonal Frequency Division Multiplexing (OFDM) symbols.

6. The transmission device of claim 5, wherein the predetermined weight range is generated in a form of table information, wherein the table information includes at least one of a weight index, a difference value between a main lobe peak level and a sidelobe peak level, a half-power beam width (HPBW), or a weight coefficient to be applied to each antenna element, and wherein the difference value between the main lobe peak level and the sidelobe peak level is mapped to the weight index in one-to-one correspondence.

7. The transmission device of claim 5, wherein the controller sets an initial beam weight and an initial beam direction, and wherein the maximum value of the interference signal is measured based on the initial beam weight and the initial beam direction.

8. The transmission device of claim 5, wherein the receiver receives a beam command message from a base station, and wherein the beam command message includes resource allocation information about the transmitted beam and the received beam.

9. An apparatus for a user equipment, the apparatus comprising:
at least one processor; and
at least one computer memory operably connected to the at least one processor and configured to store instructions for causing, when executed, the at least one processor to perform operations comprising:
receiving configuration information related to a downlink reference signal (DL-RS);
receiving the DL-RS based on a received beam in a first array;
measuring a maximum value of an interference signal among values of interference signals for beam directions and weights based on the DL-RS;
determining a first beam direction of the beam directions and a first weight of the weights based on the maximum value of the interference signal;
transmitting an uplink demodulation reference signal (UL-DMRS) based on a transmitted beam in a second array;
measuring a maximum ratio among ratios of a received strength of the DL-RS to a received strength of a self-interference (SI) signal for the beam directions and the weights based on the transmitted signal; and
determining a second beam direction of the beam directions and a second weight of the weights based on the maximum ratio, wherein the interference signal is measured within a predetermined weight range, wherein the UL-DMRS is included in a physical uplink shared channel (PUSCH), wherein, based on the UL-DMRS being enabled precoding, the UL-DMRS is generated based on pseudo-noise (PN) sequence, wherein, based on the UL-DMRS being not enabled precoding, the UL-DMRS is generated based on Zadoff-Chu (ZC) sequence having a length equal to or larger than 30, wherein the DL-RS is a channel state information (CSI)-RS or a DL-DMRS, wherein a position of the DL-DMRS is determined based on a mapping type of a physical downlink shared channel (PDSCH), wherein the PDSCH includes the DL-DMRS, wherein the DL-RS are received in a radio frame including a plurality of slots, wherein a number of a plurality of slots included in the frame is determined based on a Subcarrier Spacing (SCS) of the DL-RS, and wherein each of the plurality of slots includes 14 Orthogonal Frequency Division Multiplexing (OFDM) symbols.

10. A non-transitory computer readable storage medium, wherein the compute readable storage medium is configured to store at least one computer program including instructions for causing, when executed by at least one processor, the at least one processor to perform operations for a user equipment, the operations comprising:
receiving configuration information related to a downlink (DL)—reference signal (RS);
receiving the DL-RS based on a received beam in a first array;
measuring a maximum value of an interference signal among values of interference signals for beam directions and weights based on the DL-RS;
determining a first beam direction of the beam directions and a first weight of the weights based on the maximum value of the interference signal;
transmitting a signal based on a transmitted beam in a second array;
measuring a maximum ratio among ratios of a received strength of the DL-RS to a received strength of a self-interference (SI) signal for the beam directions and the weights based on the transmitted signal; and
determining a second beam direction of the beam directions and a second weight of the weights based on the maximum ratio, wherein the interference signal is measured within a predetermined weight range, wherein the signal is an uplink (UL)-demodulation reference signal (DMRS), wherein the UL-DMRS is included in a physical uplink shared channel (PUSCH), wherein, based on the UL-DMRS being enabled precoding, the UL-DMRS is generated based on pseudo-noise (PN) sequence, wherein, based on the UL-DMRS being not enabled precoding, the UL-DMRS is generated based on Zadoff-Chu (ZC) sequence having a length equal to or larger than 30,
wherein the DL-RS is a channel state information (CSI)-RS or a DL-DMRS,
wherein a position of the DL-DMRS is determined based on a mapping type of a physical downlink shared channel (PDSCH),
wherein the PDSCH includes the DL-DMRS,
wherein the DL-RS are received in a radio frame including a plurality of slots,
wherein a number of a plurality of slots included in the frame is determined based on a Subcarrier Spacing (SCS) of the DL-RS, and
wherein each of the plurality of slots includes 14 Orthogonal Frequency Division Multiplexing (OFDM) symbols.

\* \* \* \* \*